(12) United States Patent
Shiraishi

(10) Patent No.: US 7,948,675 B2
(45) Date of Patent: May 24, 2011

(54) SURFACE-CORRECTED MULTILAYER-FILM MIRRORS WITH PROTECTED REFLECTIVE SURFACES, EXPOSURE SYSTEMS COMPRISING SAME, AND ASSOCIATED METHODS

(75) Inventor: Masayuki Shiraishi, Kumagaya (JP)

(73) Assignee: Nikon Corporation, Tokyo (JP)

( * ) Notice: Subject to any disclaimer, the term of this patent is extended or adjusted under 35 U.S.C. 154(b) by 99 days.

(21) Appl. No.: 12/070,622

(22) Filed: Feb. 19, 2008

(65) Prior Publication Data

US 2008/0204861 A1    Aug. 28, 2008

Related U.S. Application Data

(63) Continuation-in-part of application No. 11/544,483, filed on Oct. 6, 2006, now Pat. No. 7,599,112.

(60) Provisional application No. 60/728,388, filed on Oct. 18, 2005.

(30) Foreign Application Priority Data

Oct. 11, 2005 (JP) ................ P2005-295856
Feb. 22, 2007 (JP) ................ P2007-042385

(51) Int. Cl.
    *G02B 5/08* (2006.01)
(52) U.S. Cl. .............. 359/359; 359/584; 359/586
(58) Field of Classification Search .......... 359/359, 359/577–590
    See application file for complete search history.

(56) References Cited

U.S. PATENT DOCUMENTS

| | | |
|---|---|---|
| 5,757,017 A | 5/1998 | Braat |
| 5,958,605 A | 9/1999 | Montcalm et al. |
| 6,208,407 B1 | 3/2001 | Loopstra |
| 6,229,652 B1 | 5/2001 | Bajt et al. |
| 6,262,796 B1 | 7/2001 | Loopstra et al. |
| 6,341,007 B1 | 1/2002 | Nishi et al. |
| 6,392,792 B1 | 5/2002 | Naulleau |
| 6,400,441 B1 | 6/2002 | Nishi et al. |
| 6,549,269 B1 | 4/2003 | Nishi et al. |
| 6,590,634 B1 | 7/2003 | Nishi et al. |
| 6,611,316 B2 | 8/2003 | Sewell |

(Continued)

FOREIGN PATENT DOCUMENTS

EP        1065568 A2    1/2001

(Continued)

OTHER PUBLICATIONS

Berning, "Survey of Computational Methods and Techniques in Thin Film Optics," *Physics of Thin Films*, 1963, pp. 84-100, vol. 1, Academic Press.

(Continued)

*Primary Examiner* — Lee Fineman
(74) *Attorney, Agent, or Firm* — Klarquist Sparkman, LLP

(57) ABSTRACT

Multilayer-film reflective mirrors are disclosed that exhibit desired optical characteristics and resistance to reflective-surface degradation. An exemplary multilayer-film mirror includes a base and a multilayer film on the base. The multilayer film is made of first and second layers alternatingly laminated at a prescribed period length. The surface of the multilayer film has an irregular surface profile, relative to the surface profile of the base. The multilayer film reflects incident extreme ultraviolet (EUV) light. A third layer, situated on and covering the surface of the multilayer film, is formed of a substance having substantially the same refractive index to EUV light as the refractive index of a vacuum. The third layer has a surface profile substantially the same as the surface contour of the base. The third layer is covered with a protective layer.

41 Claims, 14 Drawing Sheets

U.S. PATENT DOCUMENTS

| | | | |
|---|---|---|---|
| 6,833,223 | B2 | 12/2004 | Shiraishi |
| 6,897,963 | B1 | 5/2005 | Taniguchi et al. |
| 7,050,237 | B2 | 5/2006 | Chapman |
| 2002/0084425 | A1 | 7/2002 | Klebanoff et al. |
| 2002/0171922 | A1 | 11/2002 | Shiraishi et al. |
| 2003/0008148 | A1 | 1/2003 | Bajt et al. |
| 2003/0008180 | A1 | 1/2003 | Bajt et al. |
| 2003/0081722 | A1 | 5/2003 | Kandaka et al. |
| 2003/0147139 | A1 | 8/2003 | Kandaka et al. |
| 2004/0061868 | A1 | 4/2004 | Chapman et al. |
| 2004/0256047 | A1 | 12/2004 | Sekine |
| 2005/0109278 | A1 | 5/2005 | Liang et al. |
| 2005/0117233 | A1 | 6/2005 | Kanazawa et al. |
| 2005/0157384 | A1 | 7/2005 | Shiraishi et al. |
| 2006/0040418 | A1 | 2/2006 | Takaoka |

FOREIGN PATENT DOCUMENTS

| | | | |
|---|---|---|---|
| EP | 1 152 435 | A1 | 7/2001 |
| EP | 1150139 | A2 | 10/2001 |
| EP | 1291680 | A2 | 3/2003 |
| JP | 2002-311198 | | 10/2002 |
| JP | 2003-14893 | | 1/2003 |
| JP | 2003-066 95 | | 3/2003 |
| JP | 2005-156201 | | 6/2005 |
| JP | 2006-059835 | | 3/2006 |
| WO | WO 00/73823 | A1 | 12/2000 |
| WO | WO 01/41155 | A1 | 6/2001 |
| WO | WO02/054115 | A2 | 7/2002 |
| WO | WO02/059905 | A2 | 8/2002 |
| WO | WO03/005377 | A3 | 1/2003 |

OTHER PUBLICATIONS

Braat, "Phase correcting layers in EUV imaging systems for microlithography," *Proceedings of OSA TOPS on Extreme Ultraviolet Lithography*, 1996, pp. 152-155, vol. 4, Optical Society of America.

Gwyn et al., "Extreme ultraviolet lithography," *J. Vac. Sci. Technol.*, Nov./Dec. 1998, pp. 3142-3149, B 16(6), American Vacuum Society.

Kinoshita et al., "Soft x-ray reduction lithography using multilayer mirrors," *J. Vac. Sci. Technol.*, Nov./Dec. 1989, pp. 1648-1651, B7(6), American Vacuum Society.

Stuik et al., "Peak and integrated reflectivity, wavelength and gamma optimization of Mo/Si and Mo/Be multilayer, multielement optics for extreme ultraviolet lithography," *J. Vac. Sci. Technol.*, Nov./Dec. 1999, pp. 2998-3002, B 17(6), American Vacuum Society.

Yamamoto et al., "Layer-by-layer design method for soft-x-ray multilayers," *Applied Optics*, Apr. 1992, pp. 1622-1630, vol. 31, No. 10, Optical Society of America.

Yamamoto, "Sub-nm Figure Error Correction of an EUV Multilayer Mirror by Its Surface Milling," *7th International Conference on Synchrotron Radiation Instrumentation, Book of Abstracts*, 2000, 1 page.

Yamamoto, "Sub-nm figure error correction of an extreme ultraviolet multilayer mirror by its surface milling," *Nuclear Instruments and Methods in Physics Research A*, 2001, pp. 1282-1285, 467-468, Elsevier Science B.V.

Majkova et al., "Figure Error Correction by Reflection Wavefront Control of Cu $K_\alpha$ Grazing Incidence Multilayer Mirrors," *Optical Review*, vol. 10, No. 5, pp. 398-401, 2003.

European Search Report mailed May 28, 2009, from EPC Application No. 06 81 1216.8.

International Search Report for related International Application No. PCT/US02/21128 dated May 21, 2003.

Written Opinion for related International Application No. PCT/JP2006/319876 dated Jan. 9, 2007.

International Search Report for related International Application No. PCT/JP2006/319876 dated Jan. 9, 2007.

Office Action for related U.S. Appl. No. 11/544,483 dated Aug. 19, 2008.

Office Action for related U.S. Appl. No. 11/544,483 dated Feb. 5, 2009.

Advisory Action for related U.S. Appl. No. 11/544,483 dated Apr. 17, 2009.

Notice of Allowance for related U.S. Appl. No. 11/544,483 dated Jun. 19, 2009.

Office Action for related European Patent Application No. 06 811 216.8 dated Apr. 14, 2010.

SURFACE-CORRECTED MULTILAYER-FILM MIRRORS WITH PROTECTED REFLECTIVE SURFACES, EXPOSURE SYSTEMS COMPRISING SAME, AND ASSOCIATED METHODS

CROSS-REFERENCE TO RELATED APPLICATIONS

This application is a continuation-in-part of, and claims priority to and the benefit of, U.S. patent application Ser. No. 11/544,483, filed on Oct. 6, 2006 now U.S. Pat. No. 7,599,112, which claims priority to and the benefit of U.S. provisional application No. 60/728,388, filed on Oct. 18, 2005, which claims priority to Japan Patent application no. 2005-295856, filed on Oct. 11, 2005. The application also claims priority to Japan Patent application no. 2007-042385, filed on Feb. 22, 2007. All four of the above-listed related applications are incorporated herein by reference in their respective entireties.

FIELD

This disclosure relates to multilayer-film reflective mirrors in which a multilayer film is formed on a surface of a mirror substrate or "base." The disclosure also relates to methods for manufacturing multilayer-film reflective mirrors, to projection-exposure systems (notably, lithography systems) comprising at least one such multilayer-film reflective mirror, and to device-manufacturing methods including at least one exposure step using such an exposure system.

BACKGROUND

Among various light-based exposure systems used in photolithographic processes, exposure systems employing EUV (extreme ultraviolet) light are the subject of substantial current development activity. In these systems, EUV light is used as the exposure light, as described for example in U.S. Published Patent Application No. 2005/157384 A1.

In configuring an exposure system employing EUV light (such a system is called an "EUV lithography" system, abbreviated "EUVL" system), there are no known materials that both transmit EUV light and exhibit sufficient refraction to such light to be useful as EUV lenses. Consequently, in an EUVL system, the constituent optical systems must be configured using EUV-reflective mirrors. In certain situations, the mirrors can be oblique-incidence mirrors or multilayer-film mirrors. In EUV light reflected from a multilayer-film mirror, the respective phases of multiple fronts of weakly reflected light at layer interfaces are superposed constructively to yield high overall reflectance.

Problems Addressed

An EUV multilayer-film reflective mirror employed in an EUVL system must be fabricated with a highly accurate and precise reflective-surface shape ("surface figure" or "surface profile") having extremely small figure errors with respect to wavefront aberration of reflected light. Figure errors and problems with the multilayer film can arise during manufacture of the mirror, and can adversely affect the optical performance of the mirror. To correct these problems, techniques have been developed in which small amounts of the multilayer film are removed, layer by layer, as required from selected regions of the reflective surface. This technique is sometimes referred to as "layer-shaving." Layer-shaving can correct aberrations arising even from sub-nanometer figure errors.

The reflective surface of a multilayer-film reflective mirror is vulnerable to degradation. This degradation can be suppressed by covering the reflective surface with a protective layer. But, applying a protective layer can adversely change the optical characteristics of the multilayer-film reflective mirror. The technology disclosed below allows obtaining desired optical characteristics from a multilayer-film reflective mirror while preventing degradation of the reflective surface.

In view of the above, this invention provides, inter alia, multilayer-film reflective mirrors exhibiting desired optical characteristics and reduced degradation of the reflective surface. This invention also provides methods for manufacturing such multilayer-film reflective mirrors. It also provides light-exposure systems comprising at least one multilayer-film reflective mirror with which a lithographic substrate can be advantageously exposed and device-manufacturing methods that include use of such a light-exposure system.

Means for Solving Problems

The problems articulated above are addressed by various aspects of the invention, including multiple embodiments described below in connection with the drawings. In the following descriptions, reference numerals are used to identify particular respective components or elements, but are not intended to limit those components or elements.

According to a first aspect, an embodiment of a multilayer-film reflective mirror comprises a base, and a multilayer film on a surface of the base. The multilayer film comprises a first layer and a second layer alternatingly laminated at a prescribed period length "d" on the base. The top surface of the multilayer film has an irregular surface profile and is capable of reflecting incident extreme ultraviolet (EUV) light. An "irregular" surface is one that, as a result of a localized layer-shaving, localized layer-addition, or other surface alteration process having been performed on the multilayer-film surface to alter the wavefront of EUV light reflected from the multilayer film, deviates significantly from the surface profile of the base on which the multilayer film is formed. A third layer, covering the top surface of the multilayer film, is formed of a substance having substantially the same refractive index as the refractive index of a vacuum. A protective layer covers the surface of the third layer. By covering the top surface of the multilayer film with the third layer and covering the third layer with a protective layer, the desired optical characteristics can be obtained from the mirror while inhibiting degradation of the reflective surface.

According to a second aspect, embodiments of a light-exposure system are provided that can be used for exposing a lithographic substrate to exposure light. The system comprises at least one multilayer-film reflective mirror as summarized above. Using such a system, a lithographic substrate can be advantageously exposed using EUV light because the at least one multilayer-film reflective mirror of the system has a protected EUV-reflective surface that is resistant to surface degradation while retaining the ability to achieve the desired optical performance of the mirror.

According to a third aspect, embodiments of device-manufacturing methods are provided that include the steps of exposing a substrate using the light-exposure system summarized above, and developing the exposed substrate. With these embodiments, devices can be manufactured by processes including use of the light-exposure systems to expose the lithographic substrate advantageously.

According to a fourth aspect, methods are provided for manufacturing multilayer-film reflective mirrors. An embodiment of such a method comprises alternatingly laminating a first layer and a second layer at a prescribed period length "d" on the surface of a base to form a multilayer film capable of reflecting incident EUV light. The top surface of the multilayer film has an irregular surface profile as a result of surficial processing selected regions of the surface to alter the wavefront of EUV light reflected from the surface. A third layer, of a substance having a refractive index to EUV light that is substantially the same as the refractive index in a vacuum, is formed over the top surface of the multilayer film. A protective layer is formed to cover the surface of the third layer. According to this fourth aspect, after the top surface of the multilayer film is processed to an irregular profile, the third layer is applied to cover the multilayer-film surface, and a protective layer is applied to cover the third layer. Thus, a multilayer-film reflective mirror is manufactured that resists degradation of the reflective surface and achieves desired optical performance.

Benefits

As disclosed herein, the multilayer-film reflective mirrors produce desired optical performance while resisting degradation of the reflective surface. A light-exposure apparatus comprising such a multilayer-film reflective mirror can advantageously expose a lithographic substrate, and the light-exposure apparatus can be used to manufacture a device, such as a microelectronic device, exhibiting desired performance.

"Process amount" is a depth, in the multilayer film, to which material has been selectively removed.

Figure 1:
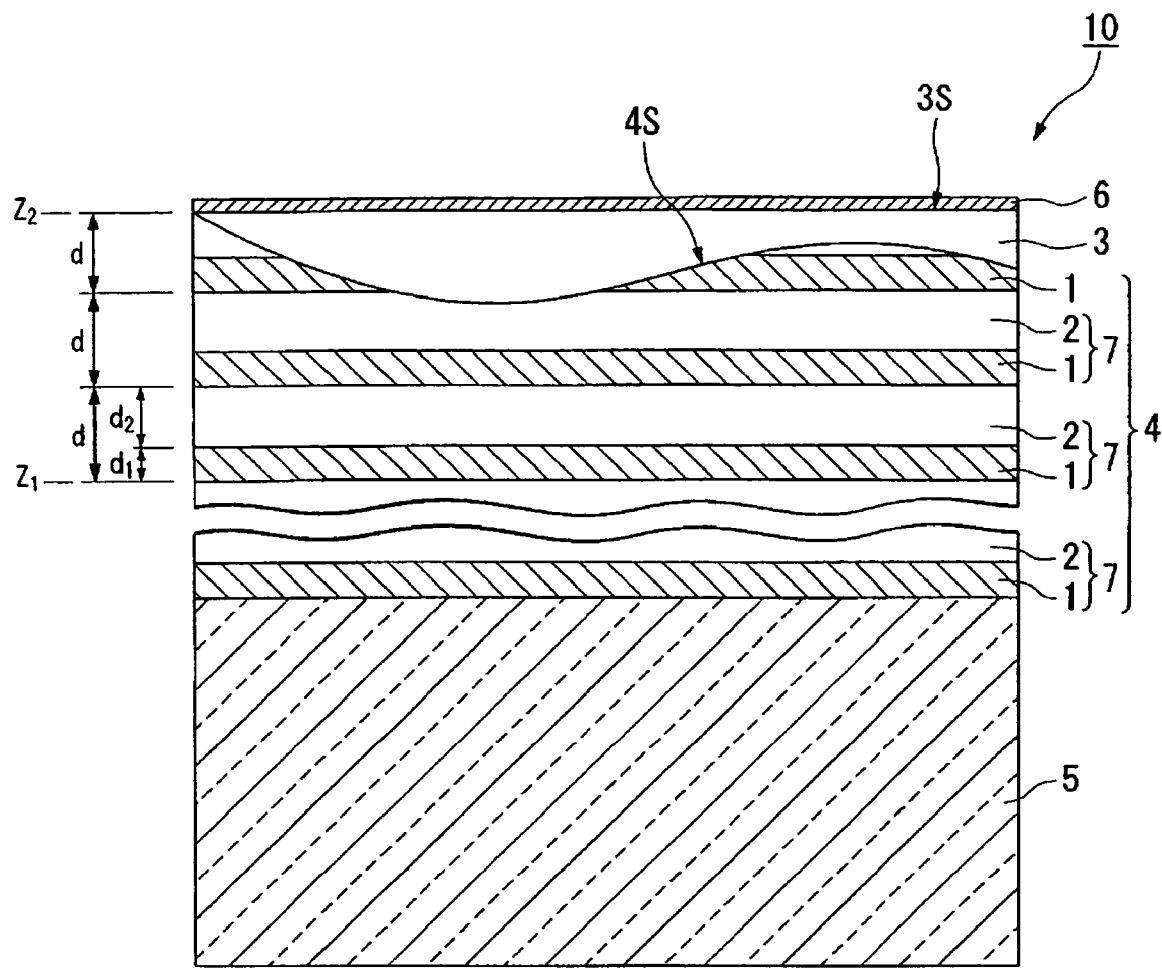
FIG. 1 is an elevational schematic diagram of an exemplary multilayer-film reflective mirror according to the first embodiment.
Figure 8:
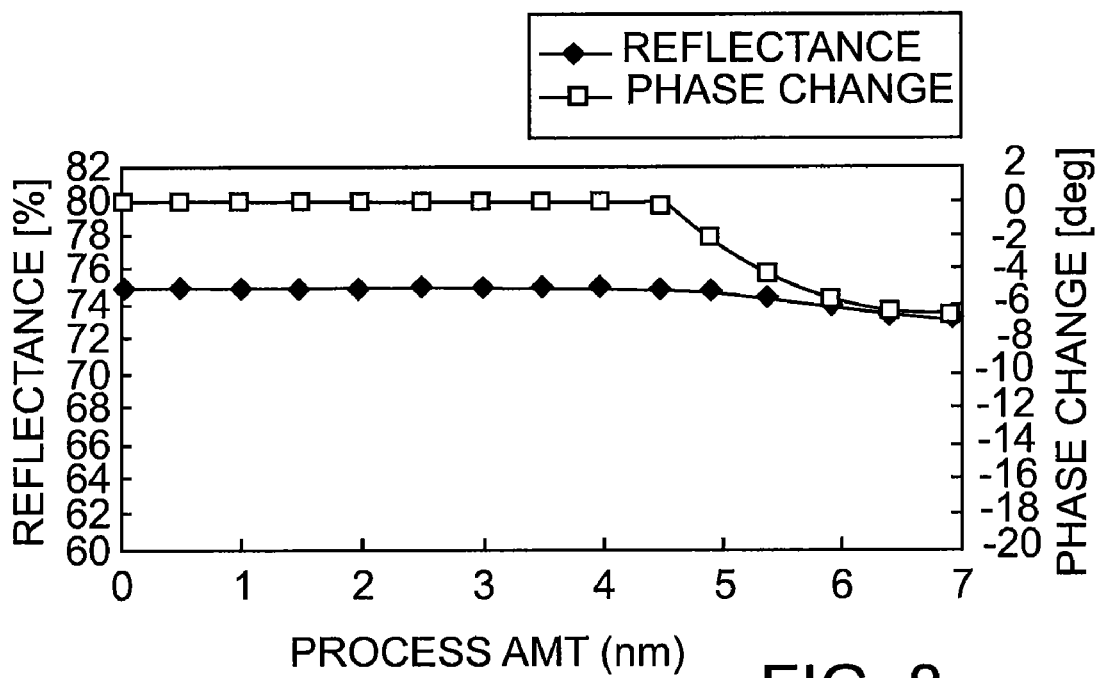

FIG. 8 is a graph representing the relationship between process amount (abscissa) and reflectance (ordinate, closed symbols) and phase change (ordinate, open symbols) exhibited by the multilayer-film reflective mirror shown in FIG. 1.

Figure 9:
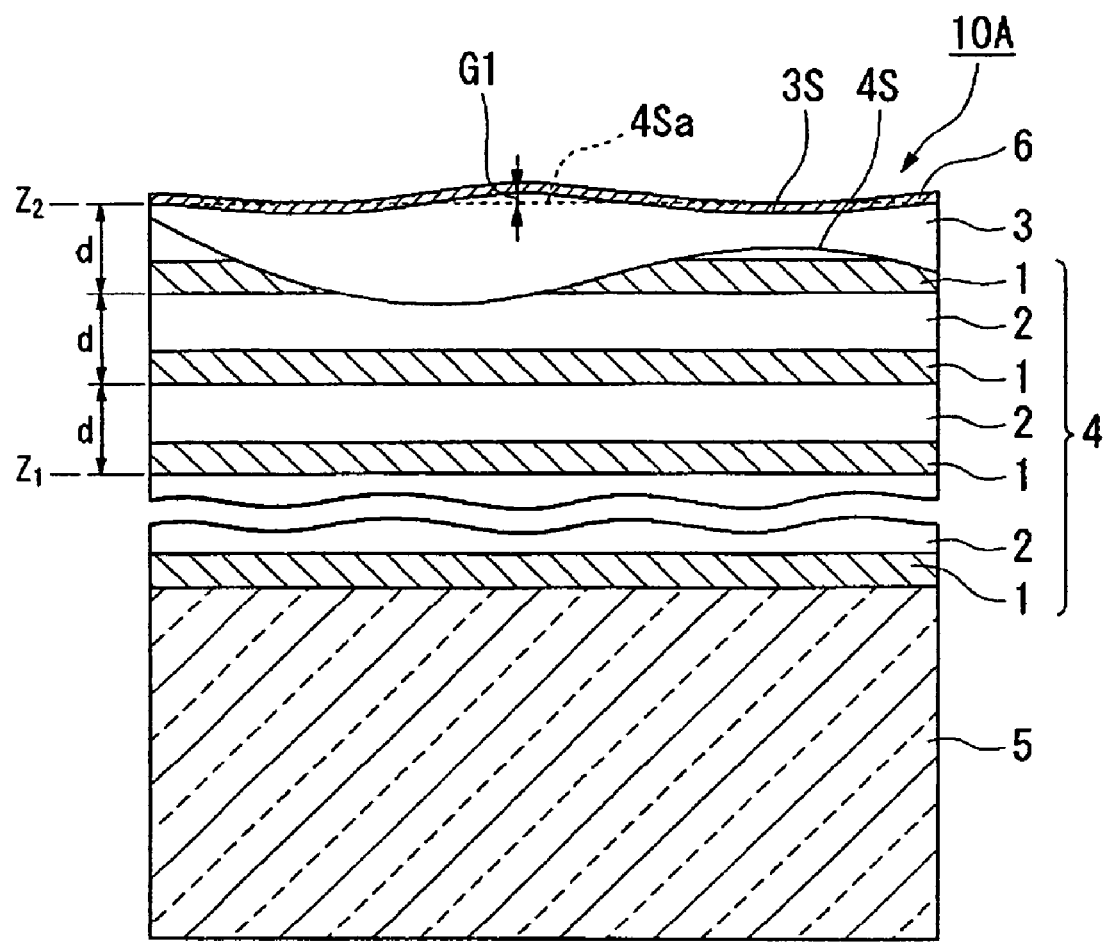

FIG. 9 is an elevational schematic depicting an exemplary multilayer-film reflective mirror according to the second embodiment.

Figure 10A:
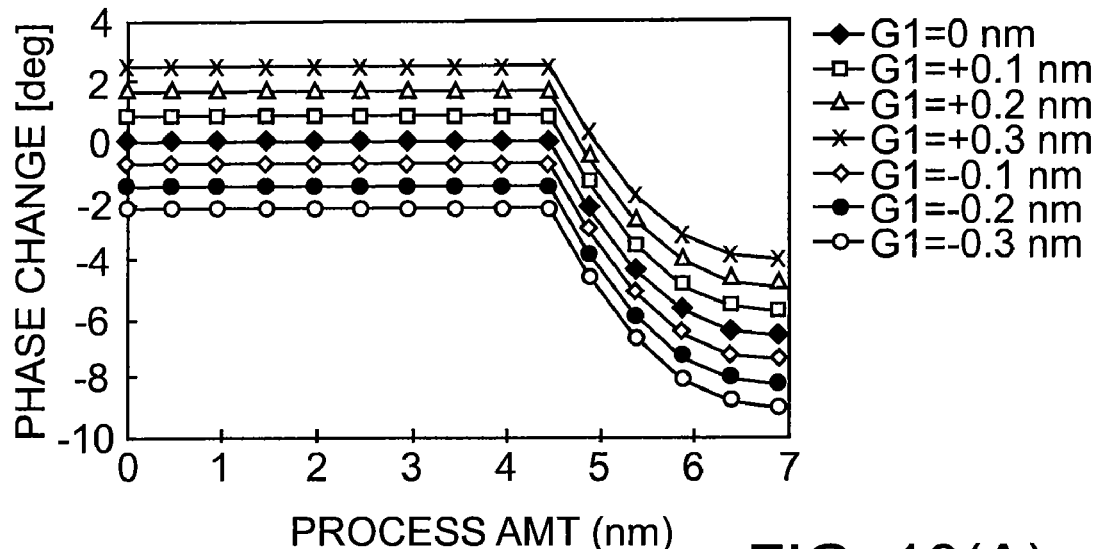
Figure 10B:
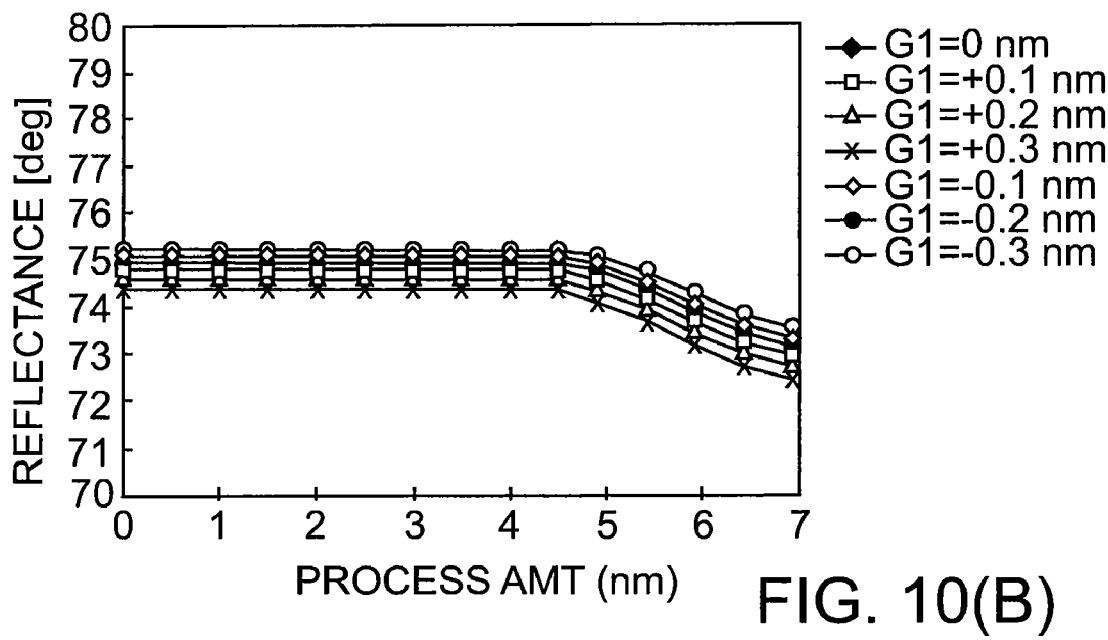

FIGS. 10(A) and 10(B) are graphs representing the relationship between process amount (abscissas) and reflectance (FIG. 10(A)) and phase change (FIG. 10(B)) exhibited by various examples of the multilayer-film reflective mirror shown in FIG. 9.

Figure 11:
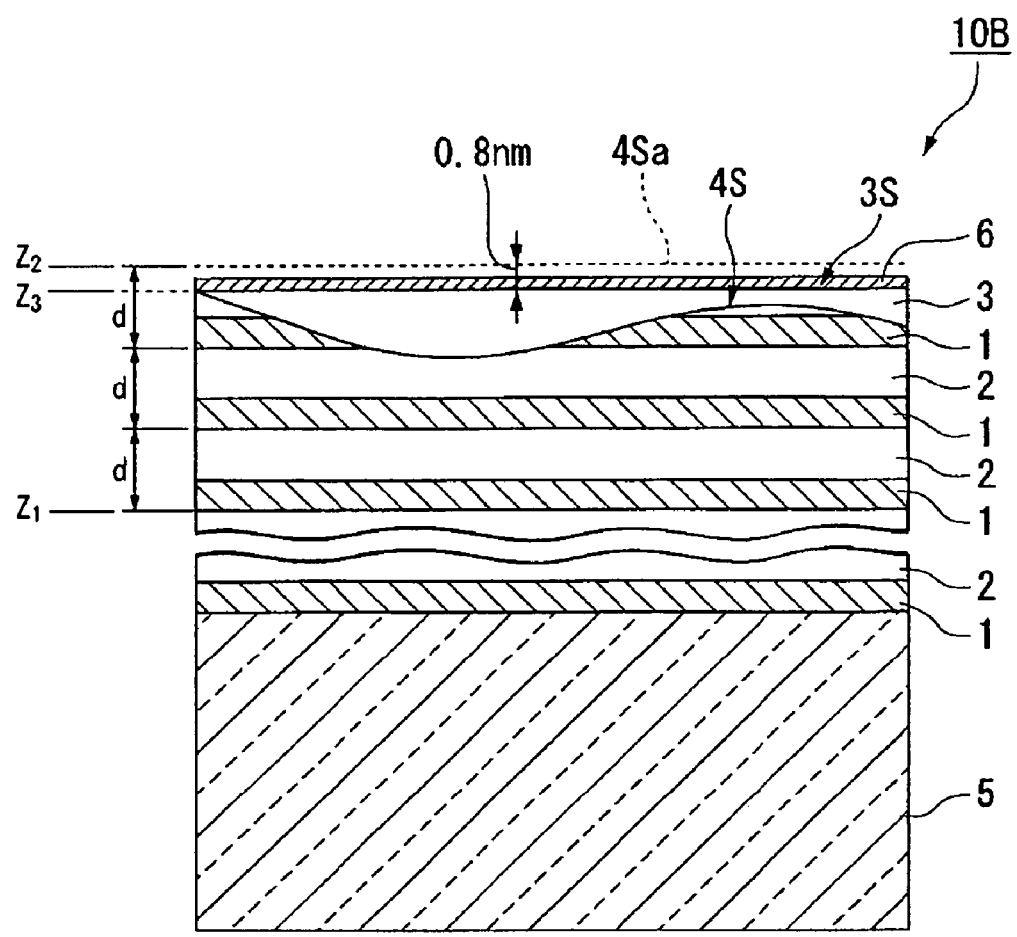

FIG. 11 is an elevational schematic depicting an exemplary multilayer-film reflective mirror according to the third embodiment.

Figure 12A:
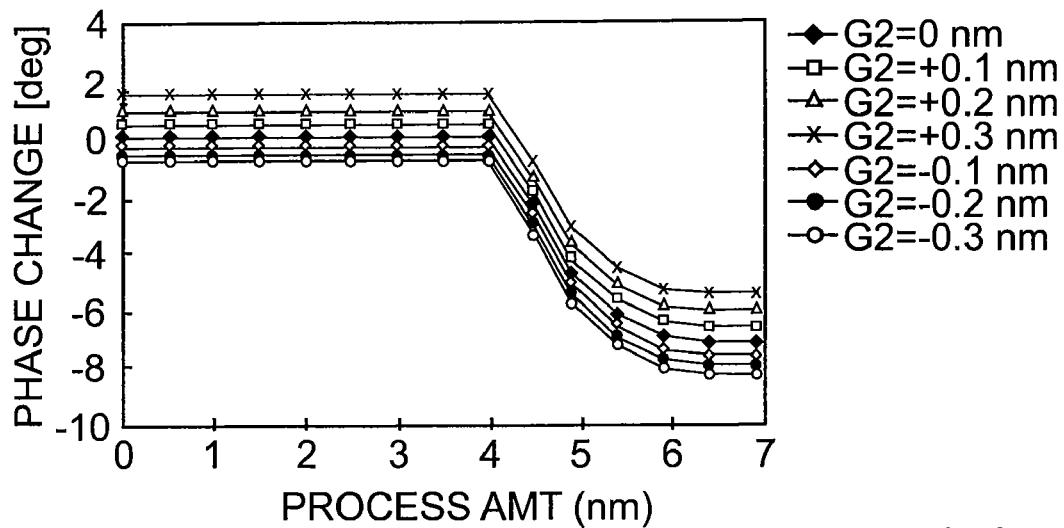
Figure 12B:
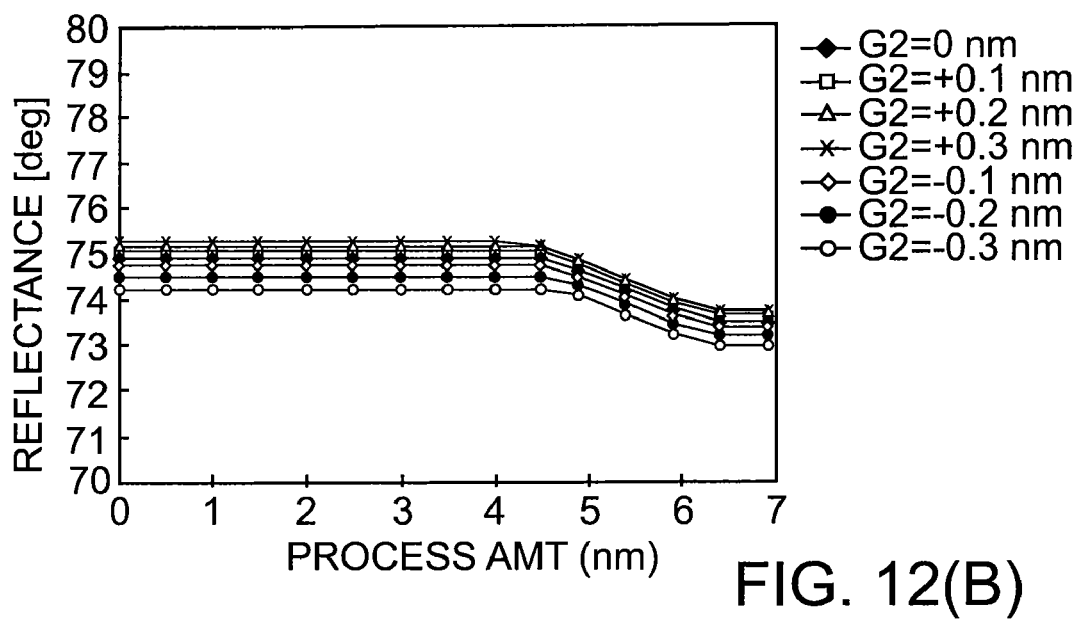

FIGS. 12(A) and 12(B) are graphs representing the relationship between process amount (abscissas) and reflectance (FIG. 12(A)) and phase change (FIG. 12(B)) exhibited by various examples of the multilayer-film reflective mirror shown in FIG. 11.

Figure 13:
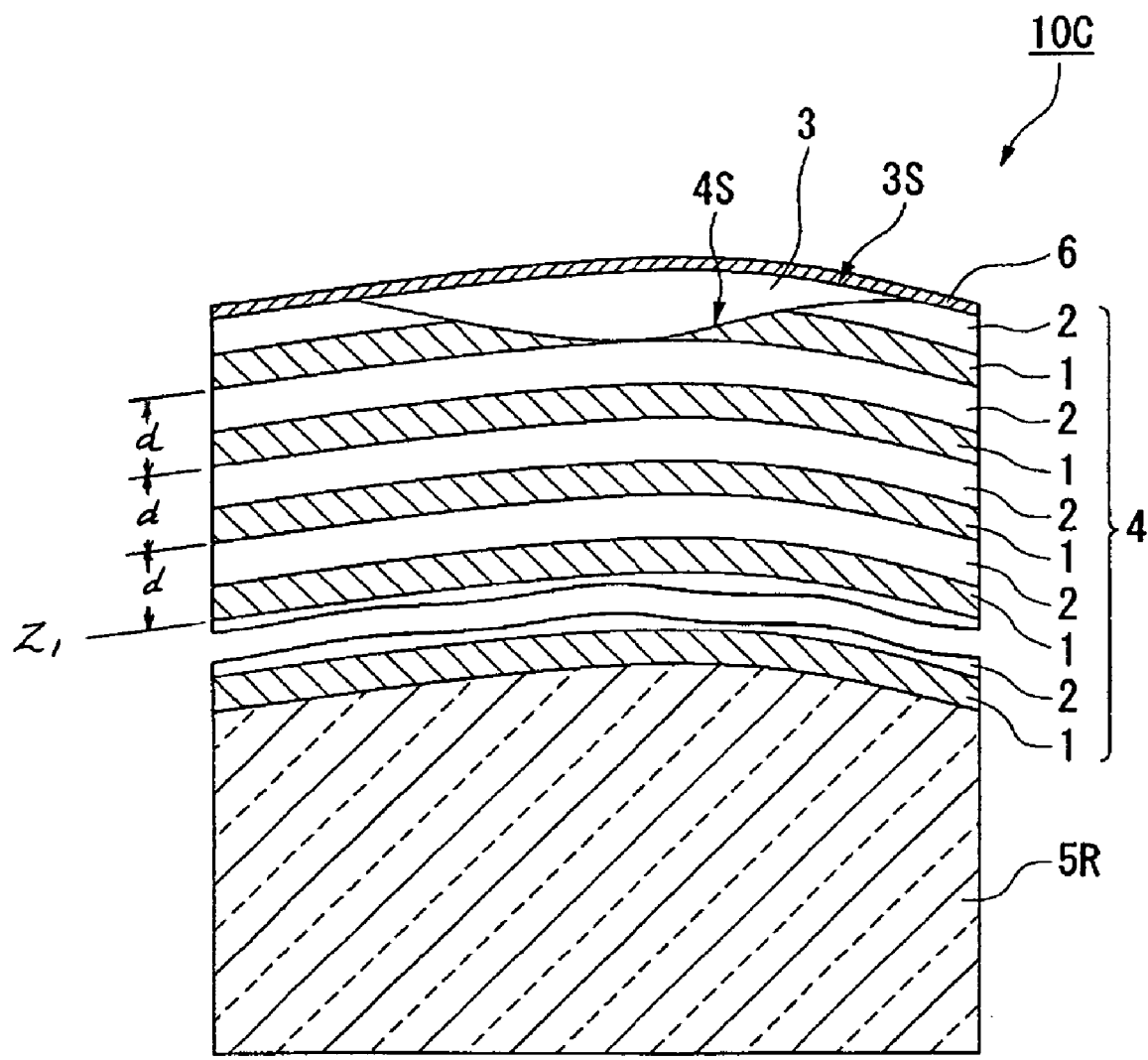

FIG. 13 is an elevational schematic depicting an exemplary multilayer-film reflective mirror according to the fourth embodiment.

Figure 14:
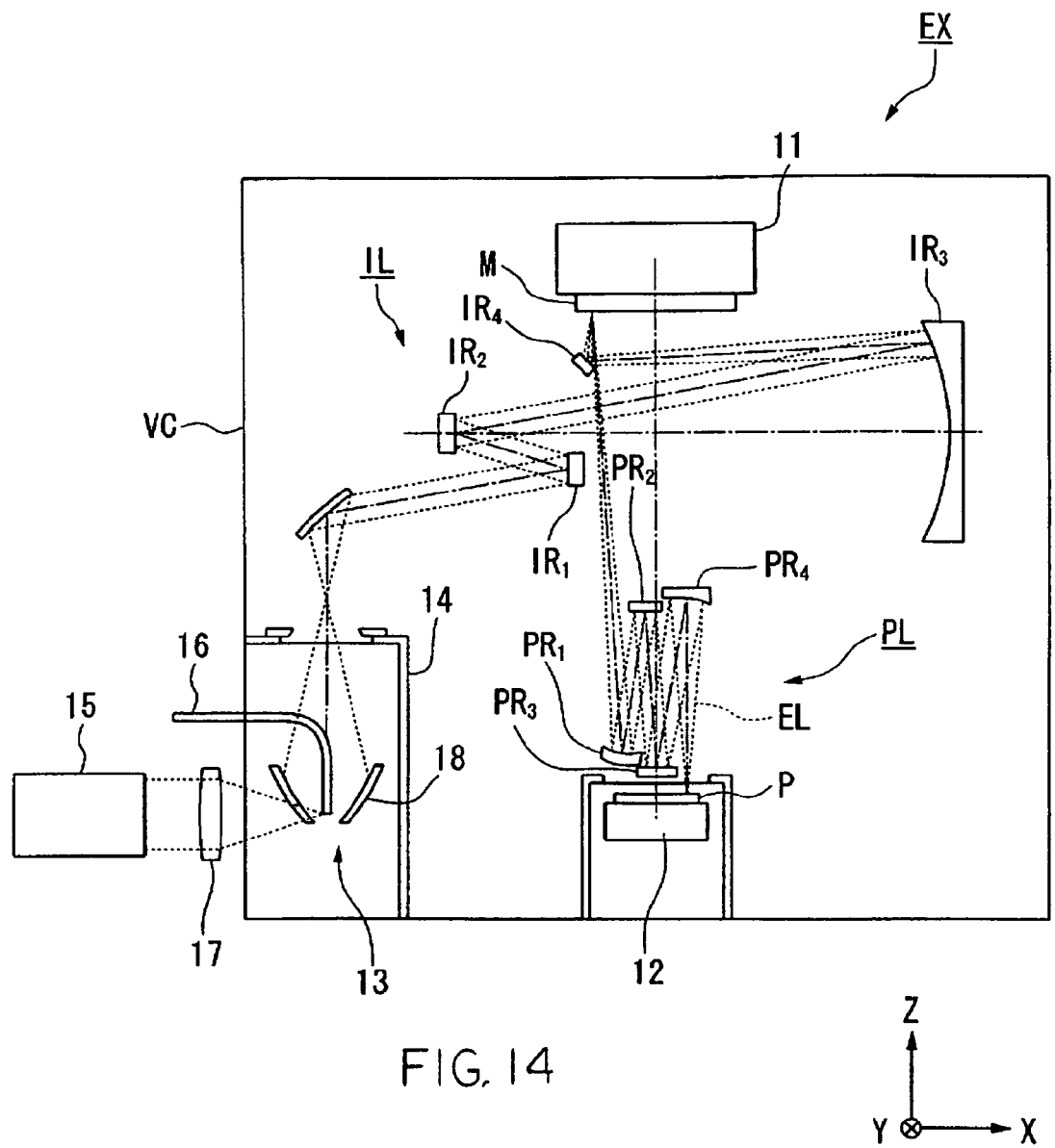

FIG. 14 is a schematic diagram of an exemplary light-exposure system according to a fifth embodiment.

Figure 15:
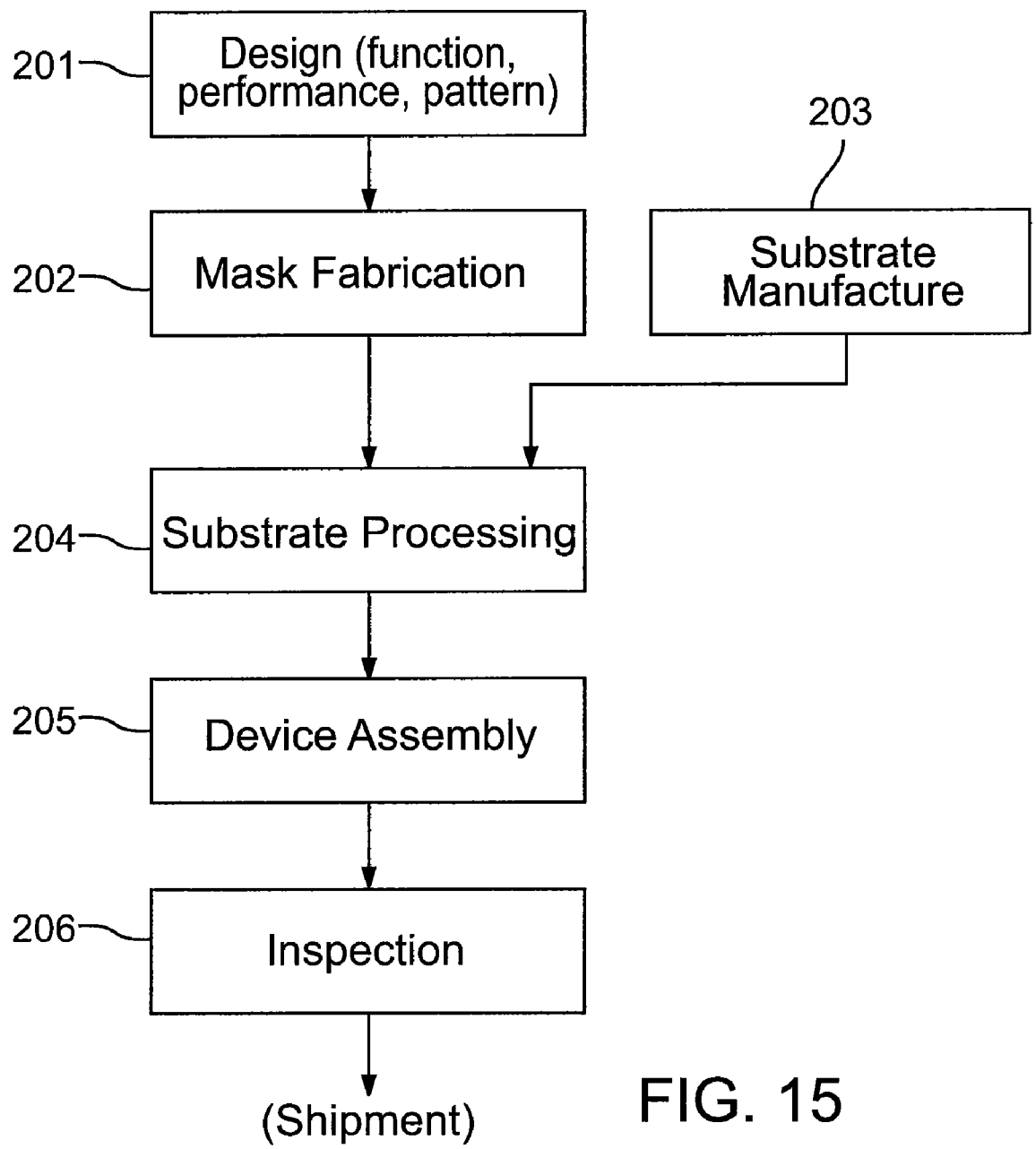

FIG. 15 is a flowchart of an exemplary microdevice-manufacturing process that utilizes a light-exposure system as disclosed herein.

DETAILED DESCRIPTION OF REPRESENTATIVE EMBODIMENTS

Representative embodiments are described below with reference to the drawings, but the invention is not limited thereto or thereby. In the following descriptions, an XYZ Cartesian coordinate system is posited, with the positional relationships of elements and members being described with reference to XYZ Cartesian coordinates. In this coordinate system, prescribed directions in a horizontal plane are denoted X-axis directions, directions perpendicular to the X-axis directions in the horizontal plane are denoted Y-axis directions, and directions perpendicular to the X-axis and Y-axis directions (i.e., vertical directions) are denoted Z-axis directions. Directions corresponding to rotations about the X-axis, Y-axis, and Z-axis are denoted $\theta_X$, $\theta_Y$, and $\theta_Z$, respectively.

In the following description, certain terms may be used such as "top," "bottom," "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

First Representative Embodiment

This embodiment is described with reference to FIG. 1, depicting a multilayer-film reflective mirror 10 comprising a base 5 and a multilayer film 4 on a surface of the base. The multilayer film 4 comprises multiple first layers 1 and multiple second layers 2 that collectively reflect incident extreme ultraviolet (EUV) light. These layers 1, 2 are alternatingly laminated at a prescribed period length "d." The surface 4S of the multilayer film 4 has an irregular profile. A third layer 3, covering the top surface 4S of the multilayer film 4, is formed of a substance having substantially the same refractive index as the refractive index of a vacuum. A protective layer 6 covers the surface 3S of the third layer 3.

An "irregular" surface profile is one that, as a result of a localized layer-shaving, localized layer addition, or other surface-alteration process having been performed on the multilayer-film surface to alter the wavefront of EUV light reflected from the multilayer film, deviates significantly from the profile of the surface of the base 5 on which the multilayer film 4 is formed. For example, if the base 5 has a planar surface, then a surface having an irregular profile deviates significantly (typically very slightly, as discussed below, such as by the thickness of a layer of the multilayer film) from planarity. Since formed layers of a multilayer film accurately conform to the surface profile of the base on which the layers are formed, and since a localized surface-alteration process changes the surface profile of the multilayer film, an "irregular" surface deviates significantly from the surface profile of the base on which the multilayer film is formed.

The EUV light to which the mirror 10 is reflective comprises electromagnetic radiation in the soft X-ray region. This EUV light has a wavelength in the range of approximately 11 to 14 nm, for example. Most incident EUV light is reflected by the multilayer film 4.

The base 5 can be formed of super-low-expansion glass, for example. Example materials of this type are "ULE," made by Corning (USA), and "Zerodur®," made by Schott (Germany).

As noted, the multilayer film 4 comprises multiple first layers 1 and second layers 2 alternatingly laminated with each other to form layer pairs each having a prescribed period length "d." The period length d is the sum of the thickness $d_1$ of the first layer 1 and the thickness $d_2$ of the second layer 2 of a respective layer pair; i.e., $d=d_1+d_2$. Based on light-interference theory, the thickness $d_1$ of the first layer 1 and the thickness $d_2$ of the second layer 2 are specified so that the phases of EUV light waves reflected from the interface between the first layer 1 and the second layer 2 coincide and constructively interfere with each other. As a result of this constructive interference, the multilayer film 4 can reflect incident EUV light with a maximum reflectance of 60% up to approximately 70%.

As one example of this embodiment, the thickness $d_1$ of the first layer 1 is 2.415 nm, the thickness $d_2$ of the second layer 2 is 4.485 nm, and the period length d of a layer pair is $d_1+d_2=6.9$ nm. As understood from the above and from the following descriptions, a "layer pair" 7 consists of one respective first layer 1 and one respective second layer 2. In this embodiment, with respect to the layer pair 7 located closest to the base 5, the first layer 1 is situated on the base side (the −Z side in the drawing) relative to the second layer 2.

On the base 5, a specified number (usually ranging from tens to hundreds) of layer pairs 7 are laminated. In one example of this embodiment, fifty layer pairs 7 are laminated on the base 5.

The first layer 1 is formed of a substance that exhibits a large difference between the refractive index for EUV light and the refractive index in a vacuum. The second layer 2 is formed of a substance that exhibits a small difference between the refractive index for EUV light and the refractive index in a vacuum. For example, in this embodiment, the first layer 1 (termed a "heavy-atom" layer) is formed of molybdenum (Mo), and the second layer 2 (termed a "light-atom" layer) is formed of silicon (Si). Thus, the multilayer film 4 in this embodiment is a Mo/Si multilayer film wherein Mo layers and Si layers are alternatingly laminated.

The refractive index in a vacuum is $n=1$. The refractive index of Mo to EUV light having wavelength $\lambda=13.5$ nm, for example, is $n_{Mo}=0.92$, and the refractive index of Si to this same EUV light is $n_{Si}=0.998$. Thus, the material of the second layer 2 has a refractive index for EUV light that is substantially the same as the refractive index in a vacuum.

In this embodiment the surface 4S of the multilayer film 4 has an "irregular" profile as a result of a localized process having been performed at the surface 4S to reduce wavefront errors of EUV light reflected from the multilayer film. Specifically, in this embodiment, the irregular surface profile was produced by layer-shaving performed at selected regions on the surface. Since the depth to which layer-shaving is performed can vary from one location to another, the surface 4S includes regions of at least one or the other of the first layer 1 and the second layer 2. In FIG. 1, the surface 4S includes regions of the first layer 1 and of the second layer 2.

The third layer 3 is deployed to cover the top surface 4S of the multilayer film 4. The third layer 3 is formed of a substance having a refractive index for EUV light that is substantially the same as the refractive index in a vacuum. Hence, the third layer 3 can be formed of a substance of which the refractive index for EUV light is substantially equal to the refractive index of the second layers 2 for EUV light. In this regard, the third layer 3 can be of the same material as the second layers 2. In this embodiment, the second layers 2 and third layer 3 are made of Si.

The protective layer 6 covers the surface 3S of the third layer 3. By way of example, the protective layer 6 can be formed of ruthenium (Ru) and can have a thickness of 2 nm.

In this embodiment the interface between the third layer 3 and the protective layer 6 (i.e., the surface 3S of the third layer 3) is situated at a height (+Z-direction) from the base 5. This height is an integer multiple of the period length d. As noted above, the period length d is the vertical distance from the base-side surface (−Z side surface or lower surface) of the first layer 1 of a prescribed layer pair 7 to the base-side surface of the first layer 1 of the next layer pair 7. In other words, the position of the interface of the third layer 3 with the protective layer 6 is an integer multiple of the period length d, in the +Z direction, from the base-side surface (−Z side surface) of a particular layer pair 7.

In this embodiment, the surface of the base 5 is substantially parallel to the X-Y plane, and the layer pairs 7 are sequentially laminated as a stack in the +Z direction from the base surface. In the following description, the position, in the Z-axis direction, of the base-side surface (lower surface or −Z side surface) of the first layer 1 of a given layer pair 7 is called the first position $Z_1$, for convenience.

Figure 2A:
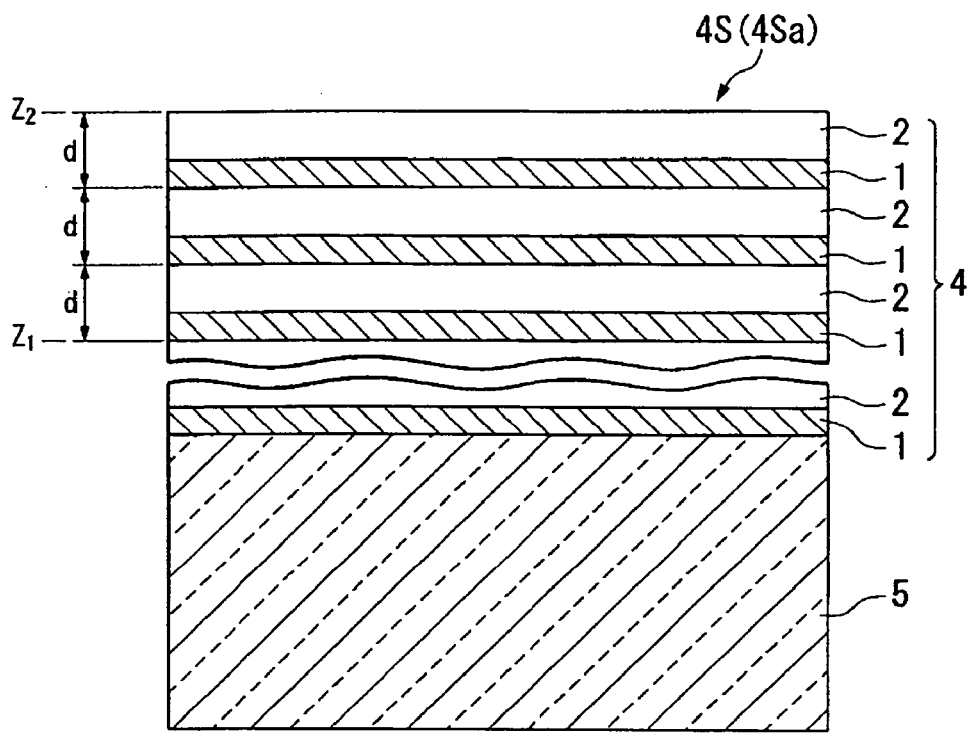
FIGS. 2(A) and 2(B) are elevational schematics showing the results of respective steps in an exemplary method for manufacturing the multilayer-film reflective mirror of the first embodiment.

An embodiment of a method for manufacturing the multilayer-film reflective mirror 10 is shown in FIGS. 2-4. FIG. 2(A) shows the results of alternatingly laminating first layers 1 and second layers 2 in a vertically stacked manner on the base 5 at a prescribed period length d. Thus, a multilayer film 4 capable of reflecting incident EUV light is formed on the base 5. The first layers 1 and second layers 2 are formed by sputtering, for example. For example, in this embodiment, the first layers 1 and second layers 2 can be formed by ion-beam sputtering. Alternatively, the first layers 1 and second layers 2 can be formed by magnetron sputtering.

In FIG. 2(A), before commencing layer-shaving, the top surface 4S (4Sa) of the multilayer film 4 is substantially parallel to the X-Y plane. In the following description, the position, in the Z-axis direction, of the surface 4Sa of the multilayer film 4 is called the second position $Z_2$, for convenience. The top surface 4Sa of the multilayer film 4 is actually the top surface of the top-most second layer 2. The second position $Z_2$ is located in the +Z direction at an integer multiple of the period length d from the first position $Z_1$.

Figure 2B:
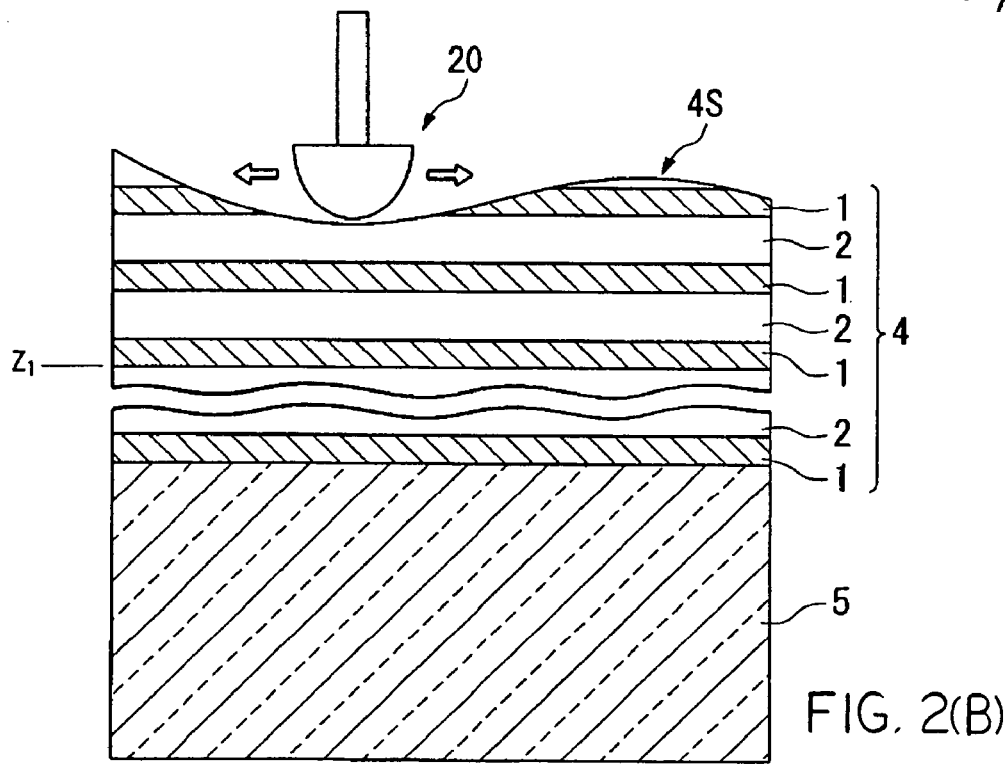

Turning now to FIG. 2(B), the top surface 4S of the multilayer film 4 now has a prescribed "irregular" profile as a result of layer-shaving processing having been performed at selected region(s) on the surface. This processing is performed as required to reduce wavefront errors of EUV light reflected from the mirror. Layer-shaving can be performed using, for example, a grinding device 20 that abrades and removes material from selected regions of the surface 4S to produce the prescribed irregular surface profile. Alternatively, the prescribed surface profile can be produced by spraying a liquid onto selected regions of the surface of the multilayer film 4.

Figure 3A:
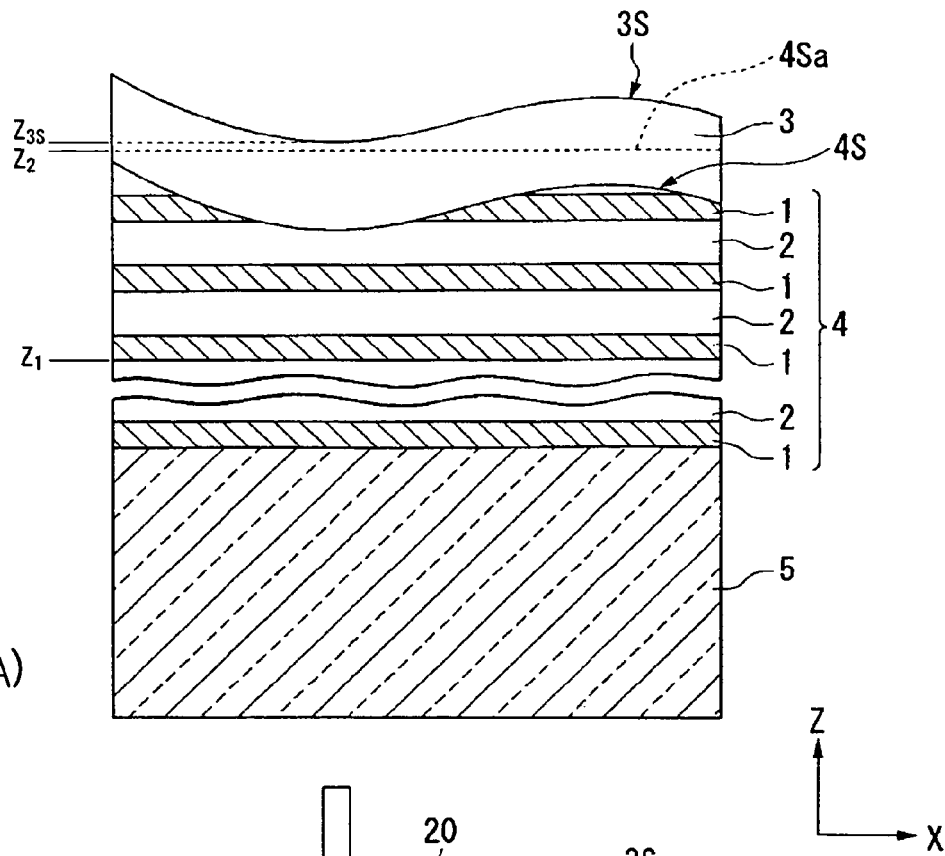
FIGS. 3(A) and 3(B) are elevational schematics showing the results of respective steps in an exemplary method for manufacturing the multilayer-film reflective mirror of the first embodiment.

Next, as shown in FIG. 3(A), a third layer 3 is formed on the top surface 4S of the multilayer film 4. The third layer 3 is of a substance having a refractive index for EUV light substantially equal to the refractive index in a vacuum. The third layer 3 covers the processed top surface 4S, and is formed using a film-forming method such as sputtering. Exemplary sputtering processes that can be used are ion-beam sputtering or magnetron sputtering. At this stage in processing, the surface 3S of the third layer 3 follows the irregular contour (surface profile) of the surface 4S. In this embodiment the third layer 3 is formed so that a portion $Z_{3S}$ of the third layer 3 situated closest to the base 5 in the Z-axis direction is still situated to the +Z side of the second position $Z_2$.

Figure 3B:
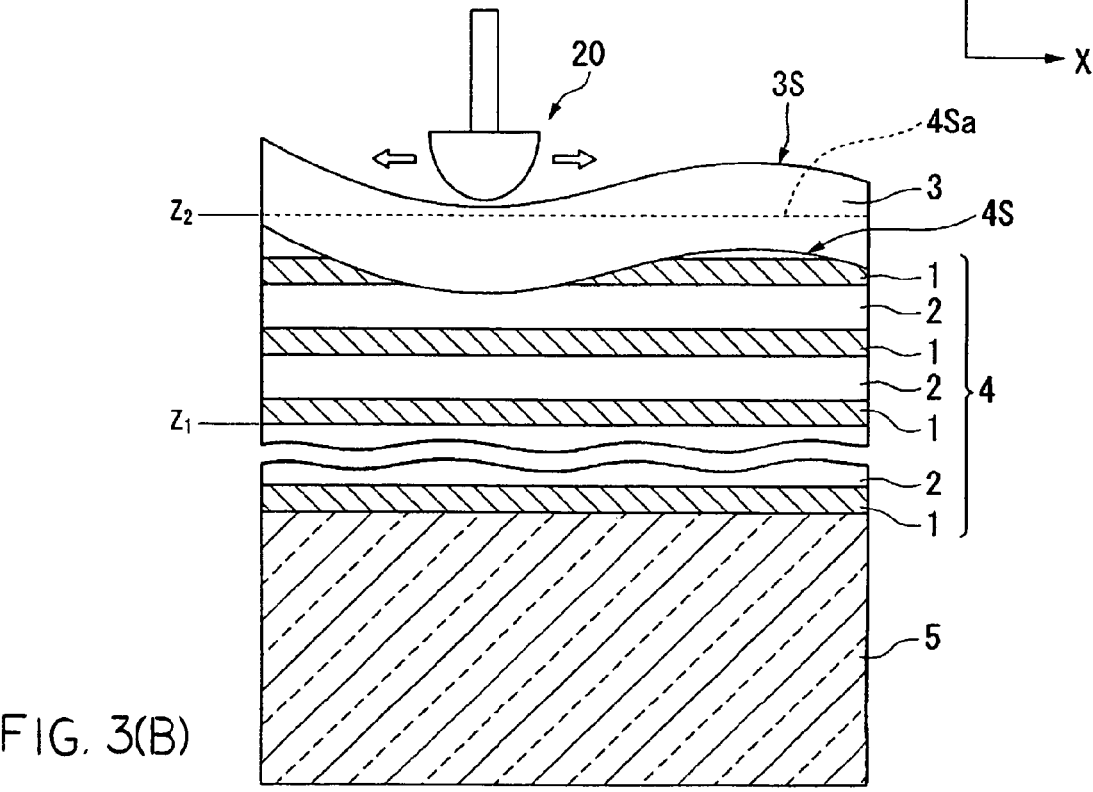

Turning to FIG. 3(B), the surface 3S of the third layer 3 is processed to remove material from the surface 3S sufficiently to place the surface 3S at an integer multiple of the period length d from the first position $Z_1$. In this embodiment the surface 3S is processed until it coincides with the second position $Z_2$ of the surface 4Sa (of the multilayer film 4 prior to localized surface alteration; see FIG. 2(A)). This removal of material from the surface of the third layer can be performed using the grinding device 20. In this embodiment the processed surface 3S is parallel to the surface of the base 5 on which the multilayer film 4 is formed.

Figure 4A:
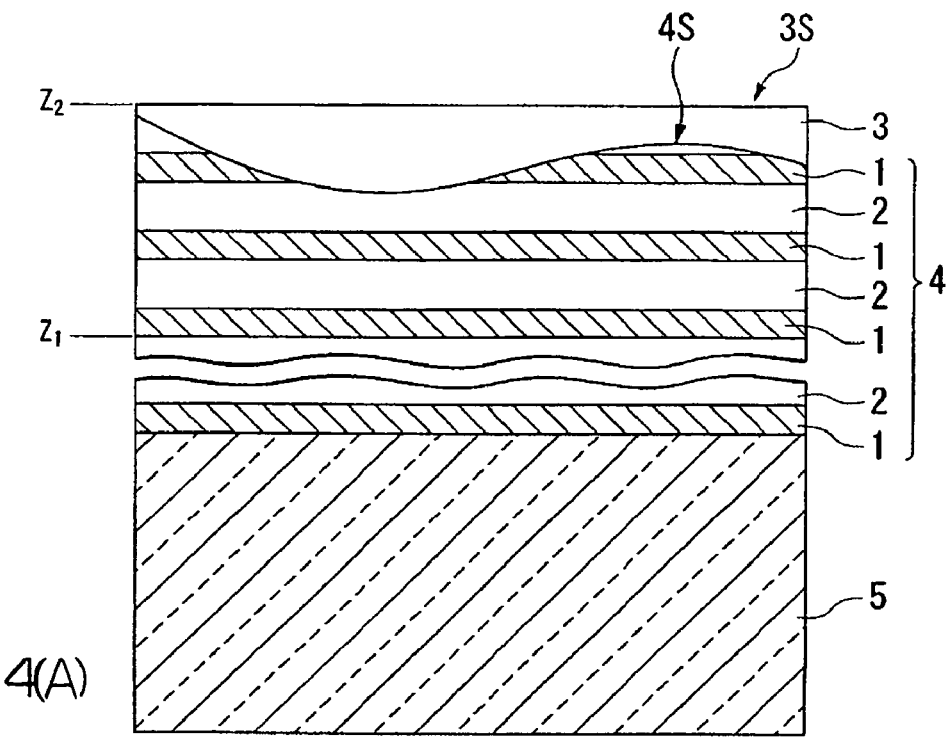
FIGS. 4(A) and 4(B) are elevational schematics showing the results of respective steps in an exemplary method for manufacturing the multilayer-film reflective mirror of the first embodiment.

The grinding device 20 can comprise a detector (not shown), such as a position sensor, that detects the depth to which material is actually being removed as layer-shaving is ongoing. For example, during use of the grinding device 20 to remove material from the surface 4S of the multilayer film 4 (FIG. 2(B)), the distribution of depth to which material is removed in the selected regions is detected by the detector and stored as data in a memory. Then, as the grinding device 20 is used to abrade material from the surface 3S of the third layer 3 (FIG. 3(B)), this data is recalled from memory and used to control the depth (as sensed by the detector) to which material of the third layer 3 is being removed. Thus, the depth to which the surface of the third layer 3 is locally abraded is controlled so that the surface 3S resulting from the grinding process coincides with the second position $Z_2$. (In this embodiment the surface 3S is planarized.) The result is shown in FIG. 4(A), in which the surface 3S of the third layer 3 is coincident with the second position $Z_2$. As noted above, the second position $Z_2$ is at a height, from the first position $Z_1$, that is an integer multiple of the period length d.

The respective surface profiles of the multilayer film 4 and of the third layer 3 can be measured using a surface-profile measuring device that measures surface shape or using a film-thickness measuring device that measures layer thickness. Using data obtained from such measurements, the action of the grinding device 20 may be controlled to ensure that the surface of the third layer 3 is abraded as required to coincide accurately with the target surface 4Sa.

During formation of the third layer 3 by sputtering, starting with the condition shown in FIG. 2(B), a mask member defining one or more prescribed openings can be disposed opposite the top surface 4S of the multilayer film. Subsequent exposure to sputtering conditions results in sputtered material for forming the third layer 3 being supplied to the top surface 4S through the opening(s) in the mask member. Thus, the surface 3S of the third layer 3 is made to coincide with the second position $Z_2$ as the third layer is being formed. The mask is configured and disposed so that the pattern of prescribed openings in the mask is aligned with the pattern of respective hills and valleys of the surface 4S, allowing more sputtered material to be deposited in the valleys than on the hills of the surface 4S. At conclusion of sputtering, the surface 3S coincides accurately with the second position $Z_2$, and the third layer 3 has the desired distribution of film thickness (FIG. 4(A)). This mask technique eliminates the need to use a grinding device 20 to remove material from the third layer 3 after forming the third layer.

Figure 4B:
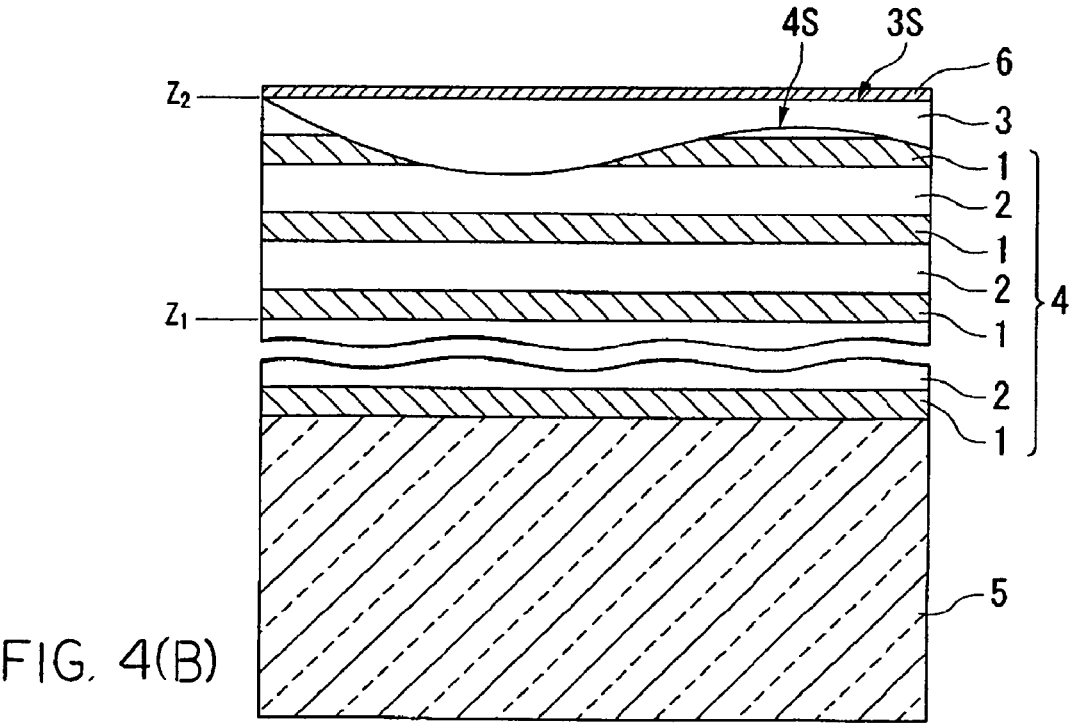

After forming the third layer 3 having the desired profile of the surface 3S, the protective layer 6 is formed on the surface 3S, as shown in FIG. 4(B). The protective layer 6 can be formed by any of various film-forming methods such as sputtering. Example sputtering processes are ion-beam sputtering and magnetron sputtering. Formation of the protective layer 6 completes formation of the multilayer-film reflective mirror 10.

As described above, this embodiment allows the surface 4S of the multilayer film 4, even a surface 4S having an irregular surface profile, to be covered by the third layer 3 and then by the protective layer 6 in a manner that yields the desired optical performance of the multilayer-film reflective mirror 10 while suppressing degradation of the mirror's reflective surface.

Because EUV light is absorbed and attenuated by the atmosphere, whenever a multilayer-film reflective mirror is used in an optical system of an EUV light-exposure system, the multilayer-film reflective mirror must be situated in a high-vacuum environment. However, "high vacuum" is not a total vacuum, the latter being very difficult to establish in the vicinity of the mirror. Consequently, the vacuum environment will contain small amounts of oxygen and/or moisture. If the surface of the multilayer film lacks a protective layer, when EUV light is directed onto the multilayer film in the presence of oxygen and/or moisture, the surface of the multilayer film may become oxidized. For example, the surface of a Mo/Si multilayer film is readily oxidized by oxygen and moisture. Surface oxidation usually degrades the optical performance of the mirror.

The inability to evacuate to total vacuum the space containing the multilayer-film reflective mirror can cause release of organic gases into the prescribed space. These gases can originate from the photosensitive material (photoresist) on the exposure substrate, from oil used in the vacuum system used for evacuating the space, and from lubricants and the like used in the various mechanisms situated in the space, for example. Contact of these organic gases with the surface of the multilayer film during times in which EUV light is also incident on the surface contaminates the surface as well as other surfaces of the mirror. The surface contamination is caused by photochemical reactions, energized by the incident EUV light, of the organic gases on the surface. The main component of the contamination is carbon, which adheres strongly to the surfaces. Hence, this contamination phenomenon is termed carbon contamination. Whenever contaminant carbon forms on the reflective surface of the multilayer-film reflective mirror, the optical performance of the mirror is degraded.

One approach to removing carbon contamination is to perform a treatment (e.g., an ozone-ashing treatment) that oxidizes the carbon contamination. But, if the reflective surface of the multilayer-film reflective mirror is a multilayer film, and if no protective layer is present, then the reflective surface will be oxidized along with the contaminant carbon, which degrades the optical performance of the mirror.

In this embodiment, as a result of the protective layer 6 being situated on the reflective surface of the multilayer-film reflective mirror 10, oxidization of the reflective surface by residual oxygen or moisture, carbon contamination of the multilayer film, and oxidization of the reflective surface accompanying treatment for removing carbon contamination, etc., are reduced or eliminated. Consequently, degradation of the reflective surface is suppressed.

A multilayer-film reflective mirror 10 according to this embodiment can be used in a projection-optical system of an EUV light-exposure system, wherein the surface 4S of the multilayer film 4 has an irregular profile to reduce wavefront errors of EUV light reflected from the mirror. Such a projection-optical system is termed a diffraction-limited optical system. Design performance of such an optical system cannot be realized unless wavefront errors are reduced below very small levels. The benchmark for allowable values of wavefront error in a diffraction-limited optical system is an RMS (root mean square) within 1/14 of the actual wavelength λ utilized by the system, according to Marechal. This is the condition for the Strehl ratio (the ratio of the maximum values of the point-image intensity between an optical system exhibiting wavefront errors versus a system having no errors) being 80% or greater. Projection-optical systems actually used in light-exposure systems usually are fabricated so that the errors are even lower.

The optical systems in substantially all EUV light-exposure systems comprise reflective mirrors. For the wavefront error (WFE) of the optical system, the tolerable figure error (FE) for each reflective mirror is given by:

$$FE = WFE/2\sqrt{N}(RMS) \quad (1)$$

where N is the number of reflective mirrors in the optical system. The divisor of 2 is in the equation because, in a reflective optical system, both incident light and reflected light are subject to respective effects of figure error. Hence, the wavefront error includes an error that is twice the figure error.

Ultimately, in a diffraction-limited optical system, the tolerable figure error (FE) for each reflective mirror, for wavelength λ and for N reflective mirrors, is given by:

$$FE = \lambda/28\sqrt{N}(RMS) \quad (2)$$

For example, the value of FE for a wavelength of 13.5 nm in an optical system having six reflective mirrors is 0.2 nm RMS. However, it is extremely difficult to manufacture aspherical reflective mirrors to such high precision, and improvements in aspherical surface processing technology and measurement technology are still needed.

Meanwhile, an important technology has been reported, by which figure errors can be corrected at substantially the nanometer level or less by "shaving" away one or more layers from selected regions of the surface of a multilayer-film reflective mirror. Yamamoto, 7th International Conference on Synchrotron Radiation Instrumentation, Berlin, Germany, Aug. 21-25, 2000, POS2-189. The principle of this method is described with reference to FIGS. 5(A)-5(B), in which it is assumed that, for the sake of simplicity, the base and the multilayer film thereon are planar.

Figures 5A, 5B:
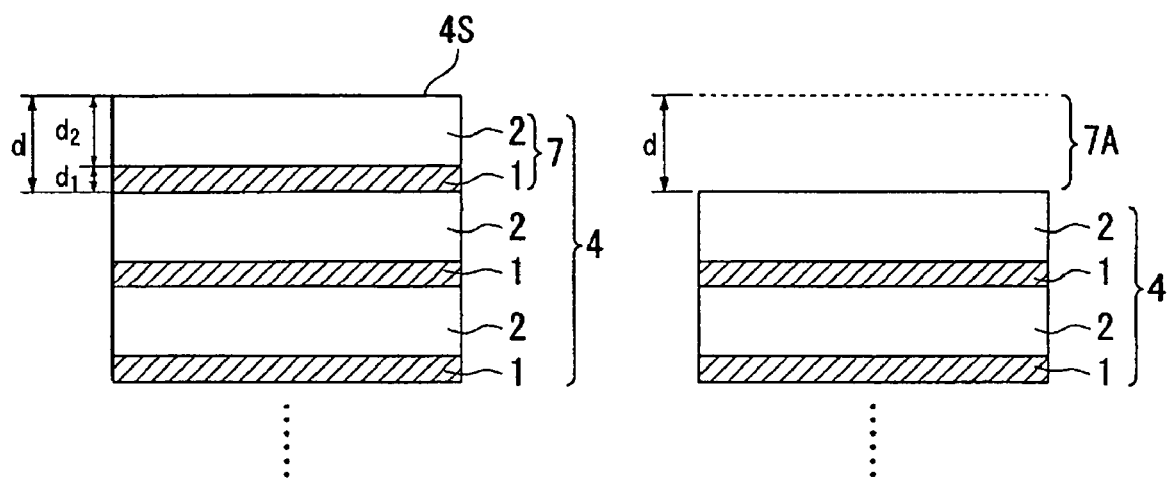
FIGS. 5(A) and 5(B) are elevational schematics illustrating before and after, respectively, removing a layer pair from a selected region of the top surface of the multilayer film to alter the wavefront of EUV light reflected from the multilayer film.

Turning first to FIG. 5(A), a multilayer film 4 is formed on a base (not shown), in which first layers 1 and second layers 2 are alternatingly laminated at a constant period length d. For correction purposes, it is possible to remove the layer pair 7 closest to the surface 4S, i.e., the top-most layer pair, as shown in FIG. 5(B). In FIG. 5(A), each layer pair 7 of the multilayer film 4 has a thickness d, and the multilayer film 4 has a top surface 4S. If the optical path length for one layer pair 7 (for a light beam traveling in the vertical direction relative to the surface 4S) is OP, the thickness of the first layer 1 is $d_1$, the thickness of the second layer 2 is $d_2$, the refractive index of the first layer 1 is $n_1$, and the refractive index of the second layer 2 is $n_2$, then:

$$OP = n_1 d_1 + n_2 d_2 \quad (3)$$

in which $d = d_1 + d_2$.

If the optical path length for the portion removed by removing the top-most layer pair 7 from the multilayer film 4 shown in FIG. 5(A), is OP', and the refractive index in a vacuum is n (=1), we have:

$$OP' = nd \quad (4)$$

As seen from Equations (3) and (4), by removing the top-most layer pair 7 of the multilayer film 4, the optical path length traveled by a light beam passing therethrough is changed. This change in optical path length is substantially equivalent to modifying the surface profile by the amount of the change. If the change in the optical path length, that is, the change in the surface profile, is denoted Δ, then:

$$\Delta = OP' - OP \quad (5)$$

In the wavelength region of EUV light, the refractive index of a substance is close to 1, so Δ is small. Accordingly, by removing a portion of the multilayer film from a selected region, as in this embodiment, substantially precise surface-profile corrections (adjustments) can be achieved.

Figure 6:
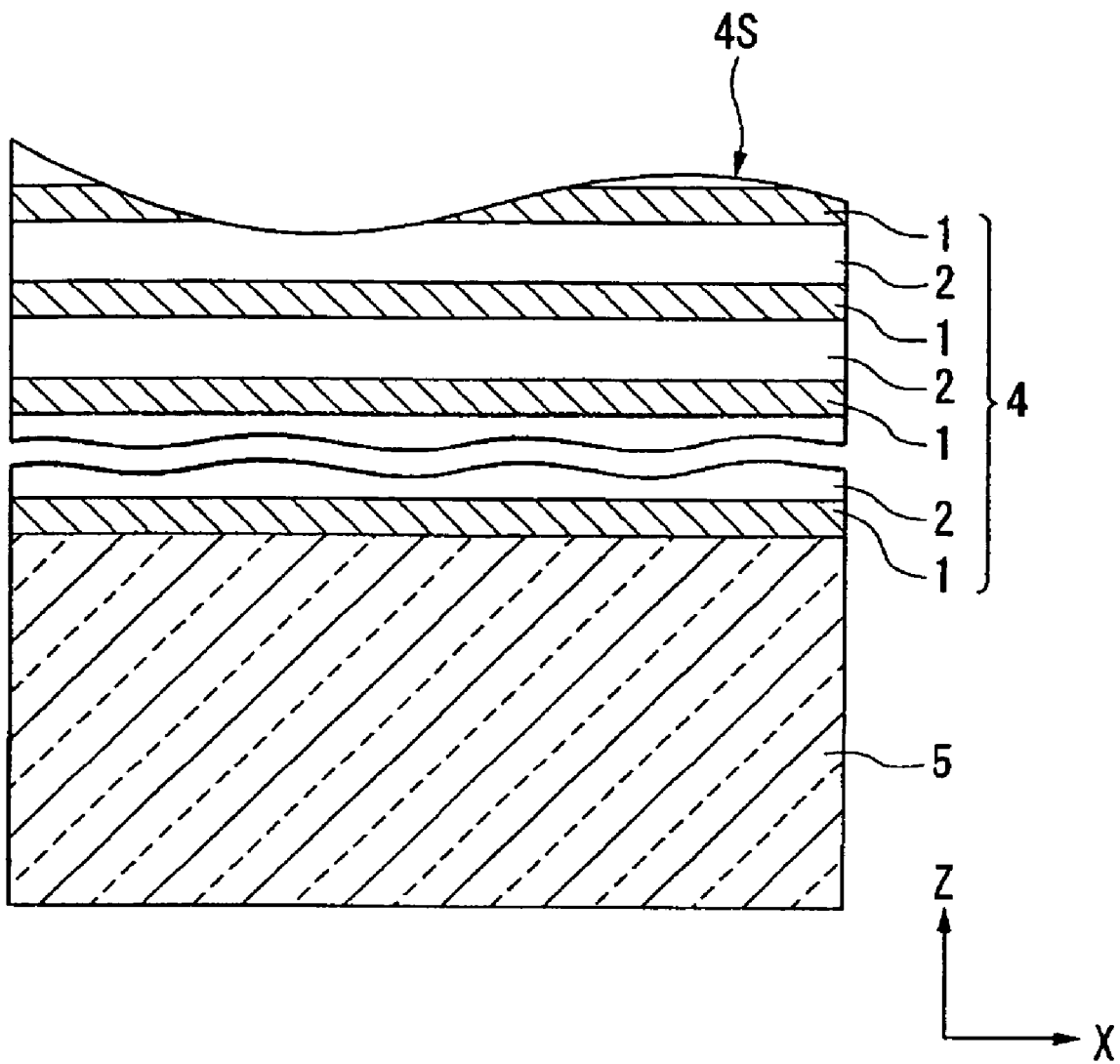
FIG. 6 is an elevational schematic depicting the result of an exemplary processing of a selected region on the surface of the multilayer film, producing an irregular surface profile sufficient to alter the wavefront of EUV light reflected from the surface. The processing involves removal of material depthwise from the surface, to a depth extending at least partially through the thickness of at least one layer of the multilayer film.

As one example, consider the case in which the incident EUV light has a wavelength λ=13.5 nm, the multilayer film 4 is a Mo/Si multilayer film, d=6.9 nm, $d_1$=2.415 nm, and $d_2$=4.485 nm. If the ratio of the thickness of the Mo layer $d_1$ to the thickness d of one layer pair is denoted Γ, then Γ=2.415÷6.9=0.35. Also, as described above, the refractive index of Mo for EUV light of λ=13.5 nm is $n_{Mo}$=0.92, and the refractive index of Si is $n_{Si}$=0.998. When changes in optical path length in the multilayer film are computed using these values, we get OP=6.698 nm, OP'=6.9 nm, and Δ=0.202 nm. Removing surface material to a depth of 6.9 nm produces a surface-profile correction (adjustment) of 0.2 nm. With an Mo/Si multilayer film, because the refractive index of each Si layer is close to 1, the change in the optical path length will mainly depend on the presence or absence of the Mo layer, and will be virtually independent of the presence or absence of the Si layer. Consequently, when removing surface material from selected regions of the multilayer film 4, it is not necessary to control the thickness of the Si layer accurately. In this example, the thickness of the Si layer is 4.485 nm, and layer-shaving may be halted part way through the thickness of that layer. Hence, by performing layer-shaving processing with a precision of several nanometers, surface-profile corrections in 0.2-nm increments are possible. In this embodiment, layer-shaving from selected regions produced the surface 4S of the multilayer film 4 with an irregular profile, as represented by FIG. 6.

Figure 7:
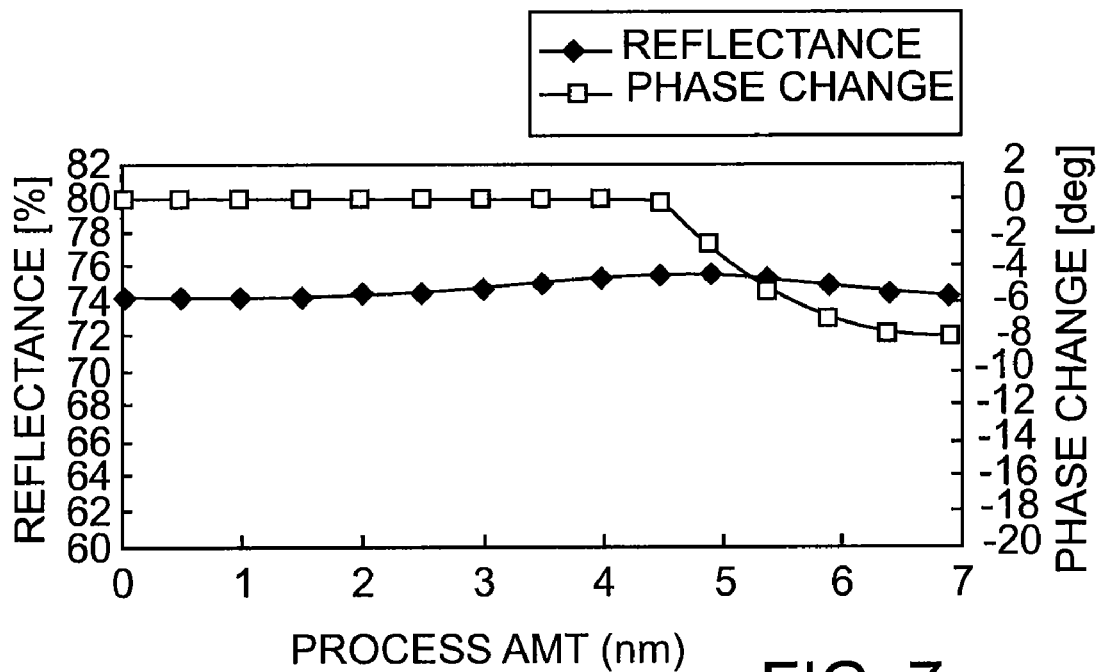
FIG. 7 is a graph representing the relationship between process amount (abscissa) and reflectance (ordinate, closed symbols) and phase change (ordinate, open symbols) exhibited by the multilayer-film reflective mirror shown in FIG. 6.

FIG. 7 is a graph of the results of a simulation of the relationship between the depth of layer-shaving ("process amount"), change in reflectance, and phase change of reflected EUV light. The evaluation was performed for cases in which no third layer or protective layer was present, as shown in FIG. 6. In FIG. 7 the process amount is the thickness of the multilayer film 4 that was removed, starting from the condition shown in FIGS. 2(A) and 5(A), for example. The reflectance is the ratio of the amount of incident EUV light on the surface of the multilayer-film reflective mirror ("shaved" by respective process amounts) to the amount of EUV light reflected from the surface. The phase change is the difference between the phase of the EUV light incident on the reflective surface of the multilayer-film reflective mirror ("shaved" by respective process amounts) to the phase of EUV light reflected from the surface.

Process amounts ranging from 0 nm to 4.485 nm involve only removal of respective depths of the top Si layer. In this range, the plot (FIG. 7) reveals substantially no change in reflectance or phase. When the process amount reaches 4.485 nm or more, material removal begins to enter the Mo layer, accompanied by changes in reflectance and phase corresponding to the thickness of the top Mo layer remaining. More specifically, in FIG. 7, the phase change resulting from removal to a depth of one layer pair 7 (6.9 nm thickness) is approximately 8 degrees. At $\lambda=13.5$ nm, this is equivalent to a wavefront change of 0.30 nm (=8 degrees÷360 degrees× 13.5 nm).

Thus, according to this embodiment, by removing a portion of the surface of the multilayer film 4 at selected location(s), the wavefront of reflected EUV light produced by the mirror can be precisely altered, and wavefront error advantageously controlled. Also, in this embodiment, because a third layer 3 is situated between the protective layer 6 and the surface 4S of the multilayer film 4 processed to control wavefront error, the desired reflectance and phase change are maintained, and desired optical characteristics obtained.

FIG. 8 is a graph of the results of a simulation of the relationship between process amount (depth of multilayer film removed), change in reflectance, and phase change when layer-shaving processing is performed to remove a portion of the surface of the multilayer film 4. The evaluation was performed for cases in which the third layer 3 and the protective layer 6 are present, as shown in FIG. 1. The refractive index of the third layer 3 for EUV light is substantially equal to the refractive index in a vacuum, and the optical path length in the third layer 3 is substantially equal to the optical path length in a vacuum. Also, the interface between the third layer 3 and the protective layer 6 is at a height, from the first position $Z_1$, that is an integer multiple of the period length d. Consequently, as shown in FIG. 8 and according to this embodiment, even when the protective layer 6 is present, by including a prescribed third layer 3, the desired profile of reflectance and phase change produced by the mirror are maintained, in a manner similar to that shown in FIGS. 6 and 7. Also, because the third layer 3 is formed of silicon, which has a low absorption ratio for EUV light, EUV light attenuation by the mirror is suppressed.

In FIG. 8, process amounts ranging from 0 nm to 4.485 nm involve only removal of respective depths of the top Si layer. In this range, the plot (FIG. 8) reveals substantially no change in reflectance or phase. When the process amount reaches, 4.485 nm or more, material removal begins to enter the Mo layer, accompanied by corresponding changes in reflectance and phase, corresponding to the thickness of the top Mo layer remaining. More specifically, in FIG. 8, the phase change resulting from removal to a depth of one layer pair 7 (6.9 nm thickness) is approximately 6.66 degrees. At $\lambda=13.5$ nm, this is equivalent to a wavefront change of 0.25 nm (=6.66 degrees÷360 degrees×13.5 nm). Thus, according to this embodiment, the wavefront can be precisely changed, to correct wavefront error without causing a large phase change.

Second Representative Embodiment

In this description of the second embodiment, the same reference numerals are used to denote respective components that are the same as and/or equivalent to corresponding components in the first embodiment. Consequently, further description of these components can be omitted or simplified.

FIG. 9 shows a multilayer-film reflective mirror 10A according to this second embodiment. In the first embodiment, an example was described in which the interface between the third layer 3 and the protective layer 6 (i.e., the surface 3S of the third layer 3) was located at a height that is an integer multiple of the period length d from the first position $Z_1$ (i.e., the interface coincided with the second position $Z_2$). In the second embodiment shown in FIG. 9, however, the surface 3S of the third layer 3 is slightly shifted vertically (by the gap or "error" G1) relative to the second position $Z_2$. So long as the error G1 is within a specified tolerance range, then the multilayer-film reflective mirror 10A can produce the desired optical performance.

FIG. 10(A) is a graph of the results of a simulation of the relationship between process amount and phase change in this embodiment. FIG. 10(B) is a graph of the results of a simulation of the relationship between process amount and change in reflectance in this embodiment. Process amount is the depth to which the selected region on the surface of the multilayer film 4 of the mirror 10A, shown in FIG. 9, has been removed. Simulation data are plotted for cases in which the error G1 is 0 nm, +0.1 nm, +0.2 nm, +0.3 nm, −0.1 nm, −0.2 nm, and −0.3 nm, respectively.

In FIGS. 10(A)-10(B), whenever the error G1 is within the range of ±0.3 nm, the phase change and the reflectance change, respectively, change slightly relative to corresponding values at G1=0. But, the amounts of these changes are very small. For example, the phase change is ±2.5 degrees whenever G1 is ±0.3 nm. When converted to wavefront, this is equivalent to ±0.09 nm. Thus, even when an error G1 exists in the surface profile of the surface 3S, the change in wavefront will be approximately 0.09 nm, which is extremely small. Thus, the optical performance of the multilayer-film reflective mirror 10A is maintained.

Third Representative Embodiment

In the following discussion of the third embodiment, the same reference numerals are used to denote respective components that are identical or equivalent to corresponding components in the first and second embodiments. Hence, further description of such components below is either simplified or omitted.

FIG. 11 depicts a multilayer-film reflective mirror 10B according to the third embodiment. In this embodiment the interface (surface 3S of the third layer 3) between the third layer 3 and the protective layer 6 is offset 0.8 nm, to the base side (−Z side), from the second position $Z_2$ (wherein $Z_2$ is an integer multiple of the period length d from the first position $Z_1$). The period length d for the multilayer film 4 is 6.9 nm, for example, as in the other embodiments described above. Despite this offset of the surface 3S from the second position $Z_2$, the multilayer-film reflective mirror 10B produces a desired optical performance.

In the following description, the offset of 0.8 nm on the base side (−Z side) from the second position $Z_2$, in a direction (+Z direction) of the first position $Z_1$ from the base, is called the third position $Z_3$.

FIG. 12(A) is a graph of the results of a simulation of the relationship between process amount and phase change, and FIG. 12(B) is a graph of the results of a simulation of the relationship between process amount and reflectance change. The simulations involve layer-shaving processing (or other localized layer-alteration processing) to remove a portion of the surface of the multilayer film 4, in a multilayer-film reflective mirror 10B as shown in FIG. 11, to a predetermined depth at a predetermined location on the surface of the multilayer film. The error G2 is the offset, from the third position Z3, of the interface between the third layer 3 and the protective layer 6. In FIG. 11 simulation results are plotted for cases in which the error G2 is 0 nm, +0.1 nm, +0.2 nm, +0.3 nm, −0.1 nm, −0.2 nm, and −0.3 nm, respectively.

As graphed in FIGS. 12(A)-12(B), whenever the error G2 is within a range of ±0.3 nm, the phase change and reflectance, respectively, change slightly compared to a situation in which G2=0. However, the magnitude of these changes is very small, being smaller than the magnitudes of changes indicated in FIGS. 10(A) and 10(B). Thus, the optical performance of the multilayer-film reflective mirror 10B of this embodiment is largely unaffected by error G2. The phase change (FIG. 12(A)) is approximately −0.8 degrees to +1.4 degrees as G2 varies over the range ±0.3 nm. Converted to wavefront, this result is equivalent to ±0.045 nm. Thus, the error G2 produces a change in wavefront of approximately 0.045 nm, which is extremely small. Hence, the optical performance of the multilayer-film reflective mirror 10B is sustained.

The description above was directed to, in this embodiment, a case in which the period length d=6.9 nm. But, even if the period length d were 7.2 nm, for example, by deploying the interface (surface 3S of the third layer 3) between the third layer 3 and the protective layer 6 at the third position $Z_3$, the desired optical performance of the multilayer-film reflective mirror 10B is sustained.

Fourth Representative Embodiment

In the following description of the fourth embodiment, the same respective reference numerals are used to denote corresponding components that are identical or equivalent to those in the other embodiments described above. Hence, description of such components is either simplified or omitted.

The embodiments described above were described in the example contexts in which the surface of the base 5 and the surface of the multilayer film 4 before commencing processing are planar surfaces that are substantially parallel to the X-Y plane. But, this planarity in these embodiments is not intended to be limiting. In the configuration according to this fourth embodiment and as shown in FIG. 13, the surface of the base SR and the top surface of the multilayer film 4 before commencing layer-shaving processing are convex and protrude in the +Z direction. FIG. 13 shows the surface 4S of the multilayer film 4 after the surface has been altered by localized layer-shaving or other localized surface-alteration technique. The third layer 3 is formed as described in other embodiments above and then shaped according to the surface contour of the base 5. The protective layer 6 is formed on the surface 3S. In this embodiment, the desired optical performance of the multilayer-film reflective mirror 10C is achieved by forming the surface 3S of the third layer 3 at a position that is an integer multiple of the period length d from the first position $Z_1$, as described in the first and second embodiments above, or by forming the surface 3S of the third layer 3 at the third position $Z_3$, as described in the third embodiment.

In an alternative embodiment, the surface of the base SR and the surface of the multilayer film 4, before commencing layer-shaving processing, are concave surfaces in the +Z side direction.

Fifth Representative Embodiment

In this embodiment, the same reference numerals are used to denote respective components that are similar to or equivalent to corresponding components in the embodiments described above. Hence, descriptions thereof are either simplified or omitted below.

FIG. 14 schematically depicts a light-exposure system EX according to this embodiment. The light-exposure system EX utilizes EUV light as the exposure light EL. Multilayer-film reflective mirrors 10 (10A-10C), as described above in the first to fourth embodiments, are used in the optical system of this exposure system EX.

The light-exposure system EX comprises a mask stage 11, a substrate stage 12, an illumination-optical system IL, a projection-optical system PL, and a chamber device VC. The mask stage 11 movable while holding a mask M. The substrate stage 12 is movable while holding a substrate P as the substrate is being irradiated by the exposure light EL. The illumination-optical system IL illuminates the mask M, held by the mask stage 11, with the exposure light EL. The projection-optical system PL projects an image of the pattern, defined on the mask M as illuminated by the exposure light EL, onto the substrate P. The chamber device VC includes a vacuum system and defines a prescribed space through which at least the exposure light EL passes. The vacuum system evacuates the prescribed space to a desired vacuum condition ($1.3 \times 10^{-3}$ Pa or less, for example).

The illumination-optical system IL comprises a plurality of optical elements $IR_1$-$IR_4$. The illumination-optical system IL illuminates the mask M with the exposure light EL produced by an upstream light source 13. The light source 13 in this embodiment is a laser-excited plasma light source that comprises a housing 14, a laser device 15 for emitting laser light, and a supplying device 16 for supplying into the housing 14 a target material for the laser light, such as xenon gas. Laser light emitted from the laser device 15 and condensed by a condensing optical system 17 is irradiated onto target material ejected from the supplying device 16. The target material irradiated by the laser light forms a plasma that generates EUV light. The EUV light generated at the supplying device 16 is condensed by a condenser 18. The EUV light passes through the condenser 18 and is incident on a collimator mirror 19 deployed outside the housing 14. As an alternative to a laser-excited plasma light source, the light source 13 may be an electrical-discharge-type plasma light source.

The illumination-optical system IL uniformly illuminates an illumination area on the mask M. The exposure light (EUV light) emitted by the illumination-optical system IL and reflected by the mask M is input to the projection-optical system PL.

The projection-optical system PL comprises a plurality of optical elements $PR_1$-$PR_4$. An image of the pattern, defined on the mask M illuminated by the exposure light EL, is projected by the projection-optical system PL onto the substrate P, on which is formed a photosensitive (resist) film. The pattern image is imprinted in the resist film.

In this embodiment, at least one of the optical elements $IR_1$-$IR_4$ of the illumination-optical system IL is a multilayer-film reflective mirror according to an embodiment within the scope of this disclosure. Alternatively or in addition, at least one of the optical elements $PR_1$-$PR_4$ of the projection-optical system PL is a multilayer-film reflective mirror according to an embodiment within the scope of this disclosure. Thus, the desired optical performance of the illumination-optical system IL and/or projection-optical system PL is achieved so the substrate P is advantageously exposed.

In the various embodiments including those described above, the surface of the multilayer film 4 has an irregular profile as a result of, for example, abrading the surface of the multilayer film 4 to remove, by layer-shaving, one or more layers from selected region(s) of the surface. It is alternatively possible to provide the surface of the multilayer film 4 with an irregular profile by, for example, adding at least one or other of a first layer 1 and a second layer 2 to a selected region(s) of the surface of the multilayer film 4. If the multilayer film 4 is formed by sputtering or the like, the surface of the multilayer film can be rendered into an irregular profile by, for example, deploying a mask member having one or more openings at position(s) opposite selected region(s) on the surface of the multilayer film 4, and supplying sputtered material for forming the respective layer(s). As the sputtered material impinges on the mask, the material passes through the opening(s) onto the selected region(s).

In the embodiments described above, cases were described in which the multilayer film 4 is an Mo/Si multilayer film as an example multilayer film. It will be understood that the material(s) used for forming the layers of the multilayer film 4 can be changed in accordance with the particular wavelength or wavelength band of EUV light with which the mirror is to be used. For example, if the EUV light is in a wavelength band in the vicinity of 11.3 nm, high reflectance from the mirror can be obtained by forming the multilayer film of the mirror as a molybdenum/beryllium multilayer film in which Mo layers and Be layers are alternatingly laminated.

Further alternatively, in the foregoing embodiments, ruthenium (Ru), molybdenum carbide ($Mo_2C$), molybdenum oxide ($MoO_2$), or molybdenum silicide ($MoSi_2$) or the like may be the material of choice for forming the first layer 1 of the multilayer film 4. Also, silicon carbide (SiC) may be the material of choice for forming the second layer 2 of the multilayer film 4.

In the foregoing embodiments, cases are described in which the third layer 3 is formed of Si. More generally, and not intending to be limiting, the third layer 3 can be formed of any of the following materials: silicon (Si), beryllium (Be), silicon carbide (SiC), silicon dioxide ($SiO_2$), or a combination thereof.

In the foregoing embodiments, cases are described in which the protective layer 6 is formed of ruthenium (Ru). More generally, and not intending to be limiting, the protective layer 6 can be formed of any of the following materials: ruthenium (Ru), ruthenium alloys, rhodium (Rh), rhodium alloys, niobium (Nb), niobium alloys, platinum (Pt), platinum alloys, molybdenum (Mo), molybdenum alloys, titanium dioxide ($TiO_2$), silicon dioxide ($SiO_2$), zirconium dioxide ($ZrO_2$), molybdenum dioxide ($MoSi_2$), and silicon carbide (SiC), or inorganic oxides such as niobium oxide, and combinations thereof.

In the foregoing embodiments, a sputtering process is used for forming the first layers 1, second layers 2, third layer 3, and protective layer 6. It will be understood that forming these layers is not limited to sputtering methods. Any of various other film-forming methods can be used, such as vacuum-evaporation deposition or CVD, depending upon the actual material of which the subject layer is formed.

In the various embodiments, a layer of a metal exhibiting a large thermal conductivity coefficient, such as a silver alloy, copper, a copper alloy, aluminum, or an aluminum alloy, may be provided between the base and the multilayer film, for example. Also or alternatively, between the base and the multilayer film, a water-soluble underlayer can be formed of a material such as lithium fluoride (LiF), magnesium fluoride ($MgF_2$), barium fluoride ($BaF_2$), aluminum fluoride ($AlF_3$), manganese fluoride ($MnF_2$), or zinc fluoride ($ZnF_2$). Alternatively, the underlayer can comprise a low-melting-temperature alloy, such as a eutectic alloy, eutectic alloys in 2- to 5-element systems comprising combinations of two or more elements selected from the group comprising Bi, Pb, In, Sn, and Cd. Other eutectic alloys include, but are not limited to, Au—Na eutectic alloy, Na—Tl eutectic alloy, and K—Pb eutectic alloy.

The exposure substrate P is not limited to semiconductor wafers used in the manufacture of semiconductor devices. Other possible substrates include, but are not limited to, glass substrates used for making display devices, ceramic wafers used for making thin-film magnetic heads, and mask or reticle substrates (e.g., synthetic quartz or silicon wafer) used in light-exposure systems.

The light-exposure system EX is not limited to step-and-scan type scanning light-exposure systems (scanning steppers) in which the mask M and substrate P move synchronously to scan and expose the pattern of the mask M onto the substrate. The system alternatively can be, for example, a step-and-repeat type projection light-exposure system (stepper) that exposes the pattern of the mask(s) M while the mask(s) M and substrate P are in stationary positions, then moving the substrate P sequentially in steps.

In a step-and-repeat type of exposure, it is permissible to transfer a reduced image of a first pattern onto the substrate P using a projection-optical system. In this technique the first pattern and the substrate P are held in respective substantially stationary positions. A single-shot exposure is performed on the substrate P using a projection-optical system, which partially superimposes a reduced image of a second pattern and the first pattern thereon. The second pattern and the substrate P are in substantially stationary positions (stitch-type single-shot light-exposure system). For a stitch-type light-exposure system, moreover, application can also be made to a step-and-stitch type light-exposure system that partially superimposes and transfers at least two patterns onto the substrate P and sequentially moves the substrate P.

The subject embodiments also can be applied to a light-exposure system that produces two mask patterns on a substrate using a projection-optical system, and performs a double exposure of one shot area on the substrate, substantially simultaneously, by one scanning exposure. This is discussed for example in U.S. Pat. No. 6,611,316, incorporated herein by reference in its entirety.

The various embodiments can also be applied to twin-stage type light-exposure systems that comprise multiple substrate stages. These systems are discussed in U.S. Pat. Nos. 6,341,007, 6,400,441, 6,549,269 6,590,634, 6,208,407, and 6,262,796.

The various embodiments also can be applied to light-exposure systems that comprise a substrate stage that holds a substrate, and a measurement stage on which a reference member including a reference mark and/or various types of photoelectric sensors are carried. This system is discussed in U.S. Pat. No. 6,897,963. Application can also be made to a light-exposure system comprising multiple substrate stages and measurement stages.

The light-exposure system EX type is not limited to light-exposure systems used in semiconductor-device manufacture and that expose a semiconductor-device pattern on a substrate P. Wide application is also possible to light-exposure systems used in liquid crystal display devices or display manufacture, and to light-exposure systems for manufacturing thin-film magnetic heads, imaging devices (CCDs), micromachines, MEMS, DNA chips, or reticles or masks, or the like.

Furthermore, to the extent allowed by law, all JP published patent documents (Kôkai documents) and United States patent disclosures cited above in the detailed description are incorporated herein by reference in their respective entireties.

The light-exposure systems EX of the various embodiments are manufactured by assembling their various subsystems (one or more of which comprising a respective combination of elements cited in any of the claims herein) to maintain the prescribed mechanical precision, electrical precision, and optical precision. To achieve these respective types of precision, before and after assembly, adjustments are made to achieve optical precision in the various optical systems, adjustments are made to achieve mechanical precision in the various mechanical systems, and adjustments are made to achieve electrical precision in the various electrical systems. The assembly processes extending from the various subsystems to the entire light-exposure system comprise mechanical connections, electric circuit wiring connections, and fluid connections, and the like, between the various subsystems. Prior to assembling from these various subsystems to the light-exposure system, individual assembly and qualification processes are performed for each of the individual assemblies and subsystems. After the various assemblies and subsystems in the light-exposure system are assembled, comprehensive adjustments and calibrations are made to insure attainment of the various precision specifications for the entire system. It is preferable that the light-exposure system be manufactured in a clean room where temperature and cleanness and the like are controlled.

A microdevice such as a semiconductor device or the like is manufactured by a number of steps. A representative sequence of steps is shown in FIG. 15, including designing the functions and performance of the microdevice (step 201); fabricating the mask (reticle) based on the design (step 202); manufacturing the substrate that is the device substrate (step 203); substrate processing (step 204) including exposing the substrate with an image of the mask pattern and processing the substrate (exposure processing) for developing the exposed substrate (as described in various embodiments above); device assembly (step 205), comprising dicing, bonding, and packaging and the like); and an inspection step 206.

Whereas the invention is discussed above in the context of representative embodiments, it will be understood that it is not limited to those embodiments. On the contrary, the invention is intended to encompass all alternatives, modifications, and equivalents as may be included in the spirit and scope of the invention, as defined by the appended claims.

What is claimed is:

1. A multilayer-film reflective mirror, comprising:
a base including a surface having a surface profile;
a multilayer film on the surface of the base, the multilayer film comprising first layers and second layers alternatingly laminated at a prescribed period length, the multilayer film being reflective to incident extreme ultraviolet (EUV) light and including an upper surface having an irregular profile;
a third layer covering the upper surface of the multilayer film and having an upper surface, the third layer being formed of a substance having a refractive index to EUV light substantially equal to the refractive index of a vacuum; and
a protective layer covering the upper surface of the third layer and forming an interface between the third layer and the protective layer, the interface being the entire region between the third layer and the protective layer and being situated at a height location from the surface of the base, the height location being an integer multiple of the period length.

2. The multilayer-film reflective mirror of claim 1, wherein the irregular profile is sufficient to reduce wavefront errors of EUV light reflected from the multilayer film, compared to wavefront errors of EUV light reflected from a corresponding regular profile.

3. The multilayer-film reflective mirror of claim 1, wherein the upper surface of the multilayer film includes regions of at least one of the first layer and second layer.

4. The multilayer-film reflective mirror of claim 1, wherein:
the first layer is formed of a substance having a refractive index, to incident EUV light, of which a difference between the refractive index and the refractive index in a vacuum is relatively large; and
the second layer is formed of a substance having a respective refractive index, to incident EUV light, of which the difference is relatively small.

5. The multilayer-film reflective mirror of claim 1, wherein the third layer is formed of a same substance as used to form the second layer.

6. The multilayer-film reflective mirror of claim 1, wherein the first layer comprises molybdenum.

7. The multilayer-film reflective mirror of claim 6, wherein the second layer comprises silicon.

8. The multilayer-film reflective mirror of claim 1, wherein the second layer comprises silicon.

9. The multilayer-film reflective mirror of claim 8, wherein the third layer comprises silicon.

10. The multilayer-film reflective mirror of claim 1, wherein the third layer comprises a material selected from the group consisting of silicon, beryllium, silicon carbide, silicon dioxide, and combinations thereof.

11. The multilayer-film reflective mirror of claim 1, wherein the protective layer comprises a material selected from the group consisting of ruthenium, ruthenium alloys, rhodium, rhodium alloys, niobium, niobium alloys, platinum, platinum alloys, molybdenum, molybdenum alloys, titanium dioxide, silicon dioxide, zirconium dioxide, molybdenum disilicide, silicon carbide, and combinations thereof.

12. The multilayer-film reflective mirror of claim 1, wherein:
the surface of the base has a planar surface profile; and
the upper surface of the multilayer film has a surface profile that is irregular relative to the planar surface profile of the base.

13. The multilayer-film reflective mirror of claim 12, wherein:
the surface of the base has a non-planar surface profile; and
the upper surface of the multilayer film has a surface profile that is irregular relative to the non-planar surface profile of the base.

14. The multilayer-film reflective mirror of claim 13, wherein the non-planar surface profile of the surface of the base is convex.

15. The multilayer-film reflective mirror of claim 13, wherein the non-planar surface profile of the surface of the base is concave.

16. The multilayer-film reflective mirror of claim 1, wherein the upper surface of the third layer is substantially planar.

17. The multilayer-film reflective mirror of claim 16, wherein the upper surface of the third layer is planar within an error of ±0.3 nm.

18. An optical system, comprising at least one multilayer-film reflective mirror, the mirror comprising (a) a base including a surface having a surface profile; (b) a multilayer film on the surface of the base, the multilayer film comprising first layers and second layers alternatingly laminated at a prescribed period length, the multilayer film being reflective to incident extreme ultraviolet (EUV) light and including an upper surface having an irregular profile; (c) a third layer covering the upper surface of the multilayer film and having an upper surface, the third layer being formed of a substance having a refractive index to EUV light substantially equal to the refractive index of a vacuum; and (d) a protective layer covering the upper surface of the third layer and forming an interface between the third layer and the protective layer, the interface being the entire region between the third layer and the protective layer and being situated at a height location from the surface of the base, the height location being an integer multiple of the period length.

19. The optical system of claim 18, configured for use with extreme ultraviolet light.

20. A light-exposure system, comprising at least one multilayer-film reflective mirror, the mirror comprising (a) a base including a surface having a surface profile; (b) a multilayer film on the surface of the base, the multilayer film comprising first layers and second layers alternatingly laminated at a prescribed period length, the multilayer film being reflective to incident extreme ultraviolet (EUV) light and including an upper surface having an irregular profile; (c) a third layer covering the upper surface of the multilayer film and having an upper surface, the third layer being formed of a substance having a refractive index to EUV light substantially equal to the refractive index of a vacuum; and (d) a protective layer covering the upper surface of the third layer and forming an interface between the third layer and the protective layer, the interface being the entire region between the third layer and the protective layer and being situated at a height location from the surface of the base, the height location being an integer multiple of the period length.

21. The light-exposure system of claim 20, configured to perform exposures of a substrate to an extreme ultraviolet exposure light.

22. A device-manufacturing method, comprising:
exposing a substrate using a light-exposure system as recited in claim 20; and
developing the exposed substrate.

23. A method for manufacturing a multilayer-film reflective mirror, comprising:
on a surface of a mirror base having a surface profile, forming a multilayer film comprising first layers and second layers alternatingly laminated at a prescribed period length, the multilayer film being reflective to incident extreme ultraviolet (EUV) light;
providing an upper surface of the multilayer film with an irregular profile relative to the surface profile of the base;
covering the upper surface of the multilayer film with a third layer comprising a substance having a refractive index to EUV light substantially equal to the refractive index of a vacuum, the third layer having an upper surface that is coextensive with the multilayer film and situated at a height location, from the surface of the base, that is an integer multiple of the period length; and
covering the upper surface of the third layer with a protective layer.

24. The method of claim 23, wherein the upper surface of the multilayer film is provided with an irregular profile by layer-shaving from one or more selected regions of the upper surface.

25. The method of claim 23, wherein the upper surface of the multilayer film is provided with an irregular profile by material addition to one or more selected regions of the upper surface.

26. The method of claim 25, wherein the material addition comprises:
situating a mask relative to the upper surface, the mask defining respective openings corresponding to the one or more selected regions; and
sputtering material through the openings onto the upper surface of the multilayer film.

27. The method of claim 23, wherein the material of the fourth layer is resistant to degradation by at least one of oxygen and moisture.

28. The method of claim 23, further comprising processing an upper surface of the third layer to remove material of the third layer from selected regions of the upper surface.

29. The method of claim 28, wherein:
the base has a substantially planar surface; and
the upper surface of the third layer is processed to planarity.

30. The method of claim 28, wherein:
the base has a substantially planar surface; and
the upper surface of the third layer is processed to planarity, within an error of ±0.3 nm.

31. The method of claim 23, wherein the upper surface of the multilayer film is provided with an irregular profile sufficient to reduce wavefront errors of EUV light reflected from the multilayer film, compared to wavefront errors of EUV light reflected from a corresponding regular profile.

32. The method of claim 23, wherein, during formation of the multilayer film:
each first layer is formed of a substance having a refractive index, to incident EUV light, of which a difference between the refractive index and the refractive index in a vacuum is relatively large; and
each second layer is formed of a substance having a respective refractive index, to incident EUV light, of which the difference is relatively small.

33. The method of claim 23, wherein the third layer is formed such that its upper surface is at a height location that is 0.8 nm toward a base side, relative to a location that is an integer multiple of the period length from the base-side surface of the first layer.

34. The method of claim 23, wherein the third layer is formed of a same substance as used to form the second layer.

35. The method of claim 23, wherein:
the first layers comprise molybdenum; and
the second layers comprise silicon.

36. The method of claim 35, wherein the third layer comprises silicon.

37. The method of claim 23, wherein the third layer is formed of a material selected from the group consisting of silicon, beryllium, silicon carbide, silicon dioxide, and combinations thereof.

38. The method of claim 23, wherein the protective layer is formed of a material selected from the group consisting of ruthenium, ruthenium alloys, rhodium, rhodium alloys, niobium, niobium alloys, platinum, platinum alloys, molybdenum, molybdenum alloys, titanium dioxide, silicon dioxide, zirconium dioxide, molybdenum disilicide, silicon carbide, and combinations thereof.

39. The method of claim 23, wherein:
the surface of the mirror base has a planar surface profile; and
the upper surface of the multilayer film is provided with a surface profile that is irregular relative to the planar surface profile of the base.

40. The method of claim 23, wherein:
the surface of the mirror base has a non-planar surface profile; and
the upper surface of the multilayer film is provided with a surface profile that is irregular relative to the non-planar surface profile of the base.

41. A method for manufacturing a multilayer-film reflective mirror, comprising:
on an upper surface of a mirror base, forming a multilayer film comprising multiple layer pairs, each layer pair comprising a respective first layer and a respective second layer, the layer pairs being formed such that the first and second layers are laminated together in an alternating manner at a prescribed period length, the multilayer film being capable of reflecting incident extreme ultraviolet (EUV) light;
processing a surface of the multilayer film to an irregular profile relative to a profile of the upper surface of the mirror base;
forming a third layer of a substance having a refractive index to EUV light that is substantially equal to the refractive index in a vacuum, thereby covering the upper surface of the multilayer film, the third layer having an upper surface that is coextensive with the multilayer film and that is situated at a height location from the upper surface of the mirror base, the height location being an integer multiple of the period length; and
forming a protective layer to cover the surface of the third layer.

* * * * *